(12) United States Patent
Nishiyama et al.

(10) Patent No.: US 12,170,838 B2
(45) Date of Patent: Dec. 17, 2024

(54) IMAGING DEVICE, IMAGING INSTRUCTION METHOD, AND IMAGING INSTRUCTION PROGRAM

(71) Applicant: FUJIFILM Corporation, Tokyo (JP)

(72) Inventors: Yukinori Nishiyama, Saitama (JP); Takehiro Koguchi, Saitama (JP); Shinya Fujiwara, Saitama (JP); Taro Saito, Saitama (JP); Tomoharu Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 127 days.

(21) Appl. No.: 18/166,699

(22) Filed: Feb. 9, 2023

(65) Prior Publication Data

US 2023/0188835 A1    Jun. 15, 2023

Related U.S. Application Data

(63) Continuation of application No. PCT/JP2021/030828, filed on Aug. 23, 2021.

(30) Foreign Application Priority Data

Aug. 28, 2020   (JP) .................................. 2020-144570

(51) Int. Cl.
*H04N 23/60*    (2023.01)
*H04N 5/77*     (2006.01)

(52) U.S. Cl.
CPC ............. *H04N 23/64* (2023.01); *H04N 5/772* (2013.01)

(58) Field of Classification Search
CPC ...... H04N 23/64; H04N 5/772; H04N 23/633; H04N 23/667

(Continued)

(56) References Cited

U.S. PATENT DOCUMENTS

2006/0066742 A1   3/2006 Miyata
2007/0024735 A1   2/2007 Yoneda et al.
(Continued)

FOREIGN PATENT DOCUMENTS

JP   2006-94145 A   4/2006
JP   2007-37050 A   2/2007
(Continued)

OTHER PUBLICATIONS

International Preliminary Report on Patentability and the Written Opinion of the International Searching Authority for International Application No. PCT/JP2021/030828, dated May 17, 2022, with an English translation.

(Continued)

*Primary Examiner* — Loi H Tran
(74) *Attorney, Agent, or Firm* — Birch, Stewart, Kolasch & Birch, LLP

(57) ABSTRACT

Provided are an imaging device, an imaging instruction method, and an imaging instruction program capable of efficiently changing an imaging condition during capturing of a moving image. In one aspect of the present invention, an imaging device is an imaging device including an imaging unit that captures a moving image and a processor. The processor receives a first operation by a user of causing the imaging unit to start capturing of a first moving image based on a first imaging parameter and of issuing an instruction to set a second imaging parameter different from the first imaging parameter during the capturing of the first moving image, receives a second operation by the user of causing the imaging unit to start capturing of a second moving image based on the second imaging parameter after the reception of the first operation, causes the imaging unit to capture the first moving image until a third instruction to end the capturing of the first moving image is received in a case where the (Continued)

second operation is received, and causes the imaging unit to end the capturing of the first moving image in a case where the third instruction is received.

20 Claims, 17 Drawing Sheets

(58) Field of Classification Search
USPC .......................................................... 386/224
See application file for complete search history.

(56) References Cited

U.S. PATENT DOCUMENTS

| | | | |
|---|---|---|---|
| 2007/0103553 A1* | 5/2007 | Hara ...................... | H04N 23/64 |
| | | | 348/E5.042 |
| 2016/0044251 A1* | 2/2016 | Wong ..................... | H04N 23/58 |
| | | | 348/239 |
| 2016/0330422 A1* | 11/2016 | Kuriyama ............ | H04N 9/8042 |
| 2017/0236552 A1* | 8/2017 | Kimura ................ | H04N 25/583 |
| | | | 386/216 |
| 2020/0145570 A1* | 5/2020 | Umeyama ............ | H04N 9/8205 |

FOREIGN PATENT DOCUMENTS

| | | | |
|---|---|---|---|
| JP | 2008-72491 A | 3/2008 | |
| JP | 2008-288830 A | 11/2008 | |
| JP | 2017-55388 A | 3/2017 | |
| JP | 2017-514326 A | 6/2017 | |

OTHER PUBLICATIONS

International Search Report for International Application No. PCT/JP2021/030828, dated Nov. 9, 2021, with English translation.

* cited by examiner

IMAGING DEVICE, IMAGING INSTRUCTION METHOD, AND IMAGING INSTRUCTION PROGRAM

CROSS-REFERENCE TO RELATED APPLICATIONS

The present application is a Continuation of PCT International Application No. PCT/JP2021/030828 filed on Aug. 23, 2021 claiming priority under 35 U.S.C § 119(a) to Japanese Patent Application No. 2020-144570 filed on Aug. 28, 2020. Each of the above applications is hereby expressly incorporated by reference, in its entirety, into the present application.

BACKGROUND OF THE INVENTION

1. Field of the Invention

The present invention relates to an imaging device, an imaging instruction method, and an imaging instruction program that captures a moving image.

2. Description of the Related Art

Regarding a technique for capturing a moving image, an imaging device that causes a display unit to display a menu screen for changing a setting of an imaging condition is described in JP2006-94145A, for example.

SUMMARY OF THE INVENTION

An embodiment according to the technique of the present disclosure provides an imaging device, an imaging instruction method, and an imaging instruction program capable of easily recording a plurality of moving images having different imaging parameters.

An imaging device according to a first aspect of the present invention is an imaging device comprising an imaging unit and a processor. The processor receives a first instruction to issue an instruction to set a second imaging parameter different from a first imaging parameter during capturing of a first moving image based on the first imaging parameter by the imaging unit, receives a second instruction to start capturing of a second moving image based on the second imaging parameter after the reception of the first instruction to cause the imaging unit to start the capturing of the second moving image, causes, in a case where the second instruction is received, the imaging unit to capture the first moving image until a third instruction to end the capturing of the first moving image is received, and causes, in a case where the third instruction is received, the imaging unit to end the capturing of the first moving image.

In the imaging device according to a second aspect, in the first aspect, the processor receives an instruction by a user and situation data, which is regarded as the third instruction in a case where a predetermined condition is satisfied, as the third instruction.

In the imaging device according to a third aspect, in the second aspect, in a case where scene detection for a moving image captured by the imaging unit is performed and a first time elapses after a scene is switched and/or in a case where a scene after the switching continues for a second time, the processor determines that the predetermined condition is satisfied and generates the situation data.

In the imaging device according to a fourth aspect, in the third aspect, in a case where a predetermined parameter exceeds a threshold value, the processor determines that the scene is switched.

In the imaging device according to a fifth aspect, in any one of the second to fourth aspects, in a case where a remaining capacity of a recording medium for recording the first moving image is smaller than a data size in a case where the first moving image is recorded for a remaining scheduled imaging time, the processor generates the situation data.

In the imaging device according to a sixth aspect, in any one of the first to fifth aspects, the processor causes the imaging unit to end the capturing of the first moving image and records the second moving image as the first moving image after the third instruction is received.

In the imaging device according to a seventh aspect, in any one of the first to sixth aspects, the processor causes the imaging unit to end the capturing of the second moving image.

In the imaging device according to an eighth aspect, in any one of the first to seventh aspects, the processor causes the imaging unit to end the capturing of the second moving image and records the second moving image in association with the first moving image recorded from the reception of the second instruction to the reception of the third instruction.

In the imaging device according to a ninth aspect, in any one of the first to eighth aspects, the processor performs image processing and compression processing based on the first imaging parameter on single moving image data output from the imaging unit to generate first moving image data for the first moving image, and performs image processing and compression processing based on the second imaging parameter on the single moving image data to generate second moving image data for the second moving image.

In the imaging device according to a tenth aspect, in the ninth aspect, the processor generates and records I frames as the first moving image data and the second moving image data in a period in which the first moving image and the second moving image are recorded in parallel.

In the imaging device according to an eleventh aspect, in any one of the first to tenth aspects, the processor records the first moving image and the second moving image on a single recording medium.

In the imaging device according to a twelfth aspect, in any one of the first to eleventh aspects, the processor causes a display device to display a remaining recording time in a case where only one of the first moving image and the second moving image is recorded and a remaining recording time in a case where both the first moving image and the second moving image are recorded.

In the imaging device according to a thirteenth aspect, in any one of the first to twelfth aspects, the processor causes a display device to display the first moving image and the second moving image.

An imaging instruction method according to a fourteenth aspect of the present invention is an imaging instruction method using an imaging instruction device including a processor that issues an imaging instruction to an imaging unit of an imaging device. The processor receives a first instruction to issue an instruction to set a second imaging parameter different from a first imaging parameter during capturing of a first moving image based on the first imaging parameter by the imaging unit to instruct the imaging unit with the received first instruction, receives a second instruction to start capturing of a second moving image based on the second imaging parameter after the reception of the first instruction to cause the imaging unit to start the capturing of the second moving image, causes, in a case where the second instruction is received, the imaging unit to capture the first moving image until a third instruction to end the capturing of the first moving image is received, and causes, in a case where the third instruction is received, the imaging unit to end the capturing of the first moving image.

An imaging instruction program according to a fifteenth aspect of the present invention is an imaging instruction program that causes a processor of an imaging instruction device to execute an imaging instruction to an imaging unit of an imaging device. The imaging instruction program causes the processor to execute a function of receiving a first instruction to issue an instruction to set a second imaging parameter different from a first imaging parameter during capturing of a first moving image based on the first imaging parameter by the imaging unit to instruct the imaging unit with the received first instruction, a function of receiving a second instruction to start capturing of a second moving image based on the second imaging parameter after the reception of the first instruction to cause the imaging unit to start the capturing of the second moving image, a function of causing, in a case where the second instruction is received, the imaging unit to capture the first moving image until a third instruction to end the capturing of the first moving image is received, and a function of causing, in a case where the third instruction is received, the imaging unit to end the capturing of the first moving image. The imaging instruction program according to the fifteenth aspect may cause the processor (computer) to execute the same configuration as in the second to thirteenth aspects. A non-transitory recording medium recording a computer-readable code of the imaging instruction program of these aspects can also be mentioned as an aspect of the present invention.

DESCRIPTION OF THE PREFERRED EMBODIMENTS

One embodiment of an imaging device, an imaging instruction method, and an imaging instruction program according to the present invention is as follows. In the description, accompanying drawings will be referred to as necessary.

First Embodiment

<Overall Configuration of Imaging Device>

Figure 1:
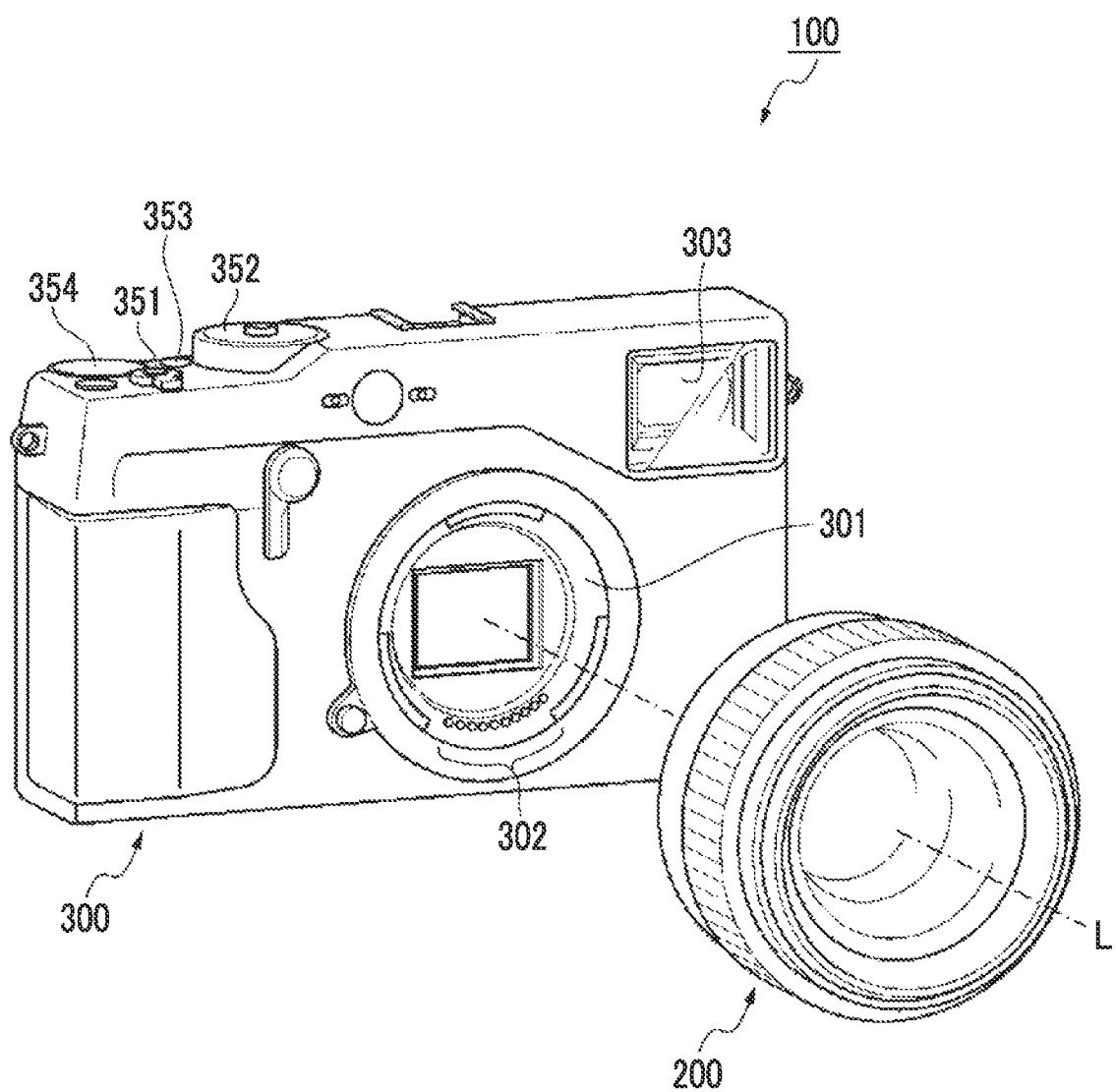
FIG. 1 is a front perspective view of an imaging device according to a first embodiment.
Figure 2:
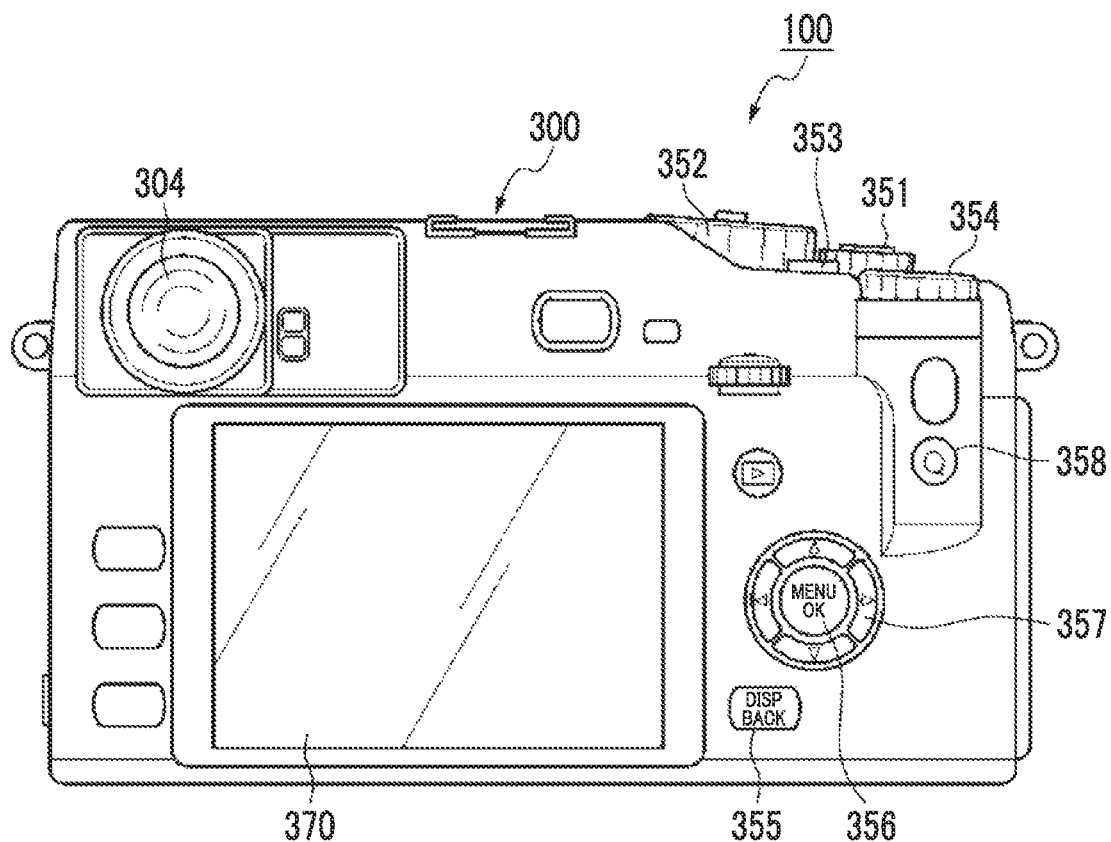
FIG. 2 is a rear view of the imaging device.
Figure 3:
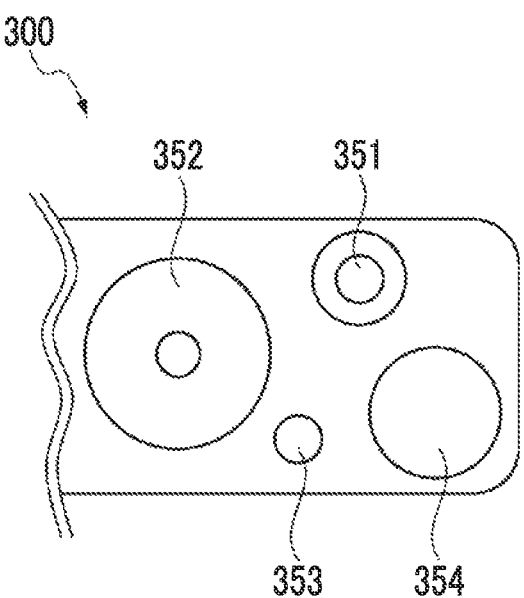
FIG. 3 is a partial top view of the imaging device.

FIG. 1 is a front perspective view of an imaging device 100 according to a first embodiment of the present invention. FIG. 2 is a rear view of the imaging device 100. FIG. 3 is a partial top view of the imaging device 100. The imaging device 100 is configured of an imaging device body 300 and an interchangeable lens 200 attached to the imaging device body 300. With coupling of a mount 301 provided on the imaging device body 300 and a mount (not shown) on the interchangeable lens 200 side corresponding to the mount 301, the imaging device body 300 and the interchangeable lens 200 are attached to each other. With releasing of the coupling, the imaging device body 300 and the interchangeable lens 200 are removed from each other. A terminal 302 is provided on the mount 301, and a terminal (not shown) is also provided on the mount on the interchangeable lens 200 side. In a case where the interchangeable lens 200 is coupled to the imaging device body 300, these terminals come into contact with each other and a communicable state is made. A front surface of the imaging device body 300 is provided with a finder window 303 and the like, in addition to the mount 301 and the terminal 302.

As shown in FIG. 2, a rear surface of the imaging device body 300 is provided with mainly a finder eyepiece portion 304, a monitor 370, a MENU/OK key 356, a cross key 357 (direction instruction button), a BACK key 355, and a Quick (Q) button 358. The MENU/OK key 356 is an operation key having both a function as a menu button for performing a command to display a menu on a screen of the monitor 370 and a function as an OK button for performing a command to confirm, execute, and the like of a selected content. The cross key 357 is an operation unit to input instructions in four directions of up, down, left, and right, and functions as a button (cursor movement operation unit) for selecting an item from a menu screen or performing an instruction to select various setting items from each menu. Up and down keys of the cross key 357 function as a zoom switch at the time of imaging or a reproduction zoom switch at the time of a reproduction mode. Left and right keys thereof function as a frame feed (feed in forward or reverse direction) button at the time of the reproduction mode. The BACK key 355 is used for erasing a desired target such as a selected item, erasing an instruction content, or returning to one previous operation state. The Q button 358 also functions as a button for performing a command to display the menu screen on the screen of the monitor 370.

As shown in FIG. 3, an upper surface of the imaging device body 300 is provided with a release button 351, a dial 352 for setting an imaging mode or a shutter speed, a function button 353 to which a desired function is assigned, and an exposure correction dial 354. The release button 351 is a two-step stroke type button capable of performing an operation of pressing a stroke halfway (so-called operation referred to as "half-press") and an operation of pressing the stroke fully (so-called operation referred to as "full-press"). With the use of these buttons or dials provided on the upper surface and the rear surface of the imaging device body 300, a user can perform operations (first instruction to third instruction) such as a capturing start of a first moving image and a second moving image, a capturing end thereof, and a setting of first and second imaging parameters, which will be described below.

Figure 4:
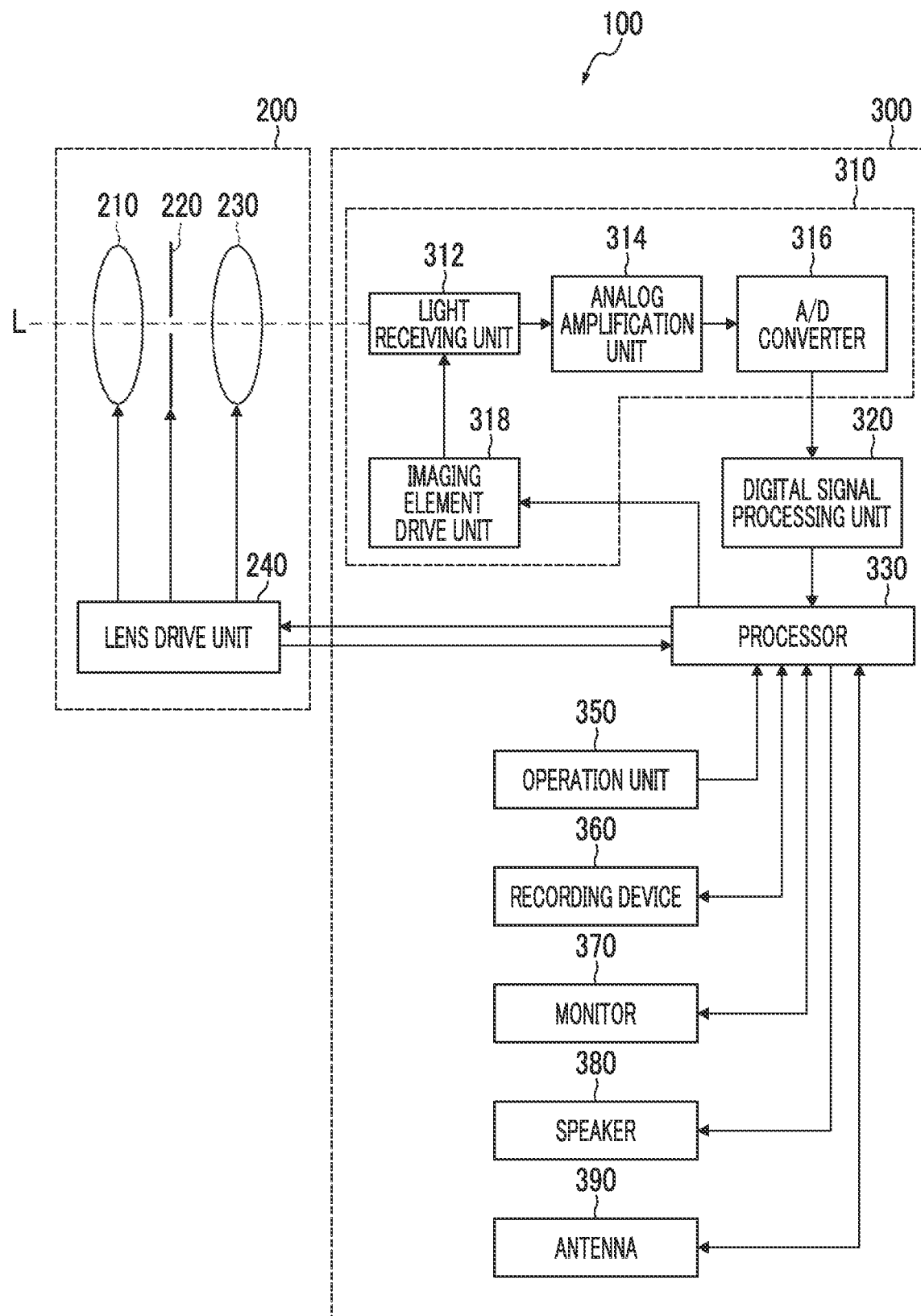
FIG. 4 is a block diagram showing a schematic configuration of the imaging device.

FIG. 4 is a block diagram showing a schematic configuration of the imaging device 100 (imaging device). The imaging device 100 is configured of the interchangeable lens 200 and the imaging device body 300, and forms a subject image (optical image) on a light receiving unit 312 of an imaging element 310 (imaging element) with an imaging lens including a zoom lens 210 and a focus lens 230 described below. Although the case where the imaging device 100 comprises the interchangeable lens 200 is described in the first embodiment, a lens device (optical system) may be fixed to a camera body.

<Configuration of Interchangeable Lens>

The interchangeable lens 200 comprises the zoom lens 210, a stop 220, the focus lens 230, and a lens drive unit 240. The lens drive unit 240 drives the zoom lens 210 and the focus lens 230 forward and backward in a direction of an optical axis L in response to a command from a processor 330 (lens drive control unit 346 in FIG. 5: processor) to perform zoom (optical zoom) adjustment and focus adjustment. The zoom adjustment and the focus adjustment may be performed in response to a zoom operation and a focus operation (moving rotationally with a zoom ring and a focus ring (not shown) or the like) performed by a user, in addition to the command from the processor 330. The lens drive unit 240 controls the stop 220 in response to the command from the processor 330 to adjust exposure. On the other hand, information such as positions of the zoom lens 210 and the focus lens 230 and an opening degree of the stop 220 is input to the processor 330.

<Configuration of Imaging Device Body>

The imaging device body 300 comprises the imaging element 310 (imaging unit), a digital signal processing unit 320, the processor 330 (processor), an operation unit 350, a recording device 360 (recording device, memory), the monitor 370 (display device), and a speaker 380. The imaging device body 300 may have a shutter (not shown) for blocking light transmitted through the imaging element 310. The shutter may be a mechanical shutter or an electronic shutter. In a case of the electronic shutter, the processor 330 controls a charge accumulation period of the imaging element 310, and thus an exposure time (shutter speed) can be adjusted.

<Configuration of Imaging Element>

The imaging element 310 comprises the light receiving unit 312, an analog amplification unit 314, an A/D converter 316, and an imaging element drive unit 318. The light receiving unit 312 comprises a light receiving surface on which a large number of light receiving elements are arranged in a matrix. Subject light transmitted through the zoom lens 210, the stop 220, and the focus lens 230 is imaged on the light receiving surface of the light receiving unit 312, and is converted into an electric signal by each light receiving element. A color filter of R (red), G (green), or B (blue) is provided on the light receiving surface of the light receiving unit 312, and a color image of a subject can be acquired based on a signal of each color. In the present embodiment, a complementary metal-oxide semiconductor (CMOS) type color image sensor can be used as the imaging element 310.

In an example of the configuration of the CMOS type image sensor, the analog amplification unit 314 is provided for each pixel or each of a plurality of pixels constituting the light receiving unit 312. A pixel signal is amplified by the analog amplification unit 314, then read out in line units, and supplied to the analog-to-digital (A/D) converter 316. The A/D converter 316 converts the supplied pixel signal into a digital pixel signal and supplies the converted signal to the digital signal processing unit 320. The digital signal processing unit 320 performs digital correlative double sampling processing, digital gain processing, correction processing, and the like to convert the digital pixel signal into a digital image signal. The imaging element drive unit 318 drives the imaging element 310 in response to the command from the processor 330 (imaging control unit 336; processor).

In a case where the imaging element 310 is the CMOS type image sensor, an imaging element drive unit, an analog amplification unit, and an A/D converter are often included in the imaging element package as shown in FIG. 4, but an image sensor having a configuration different from this aspect may be used.

A color image sensor of an XY address type, a charge-coupled device (CCD) type, or the like, in addition to the CMOS type, can be used as the imaging element 310.

<Processor Configuration>

Figure 5:
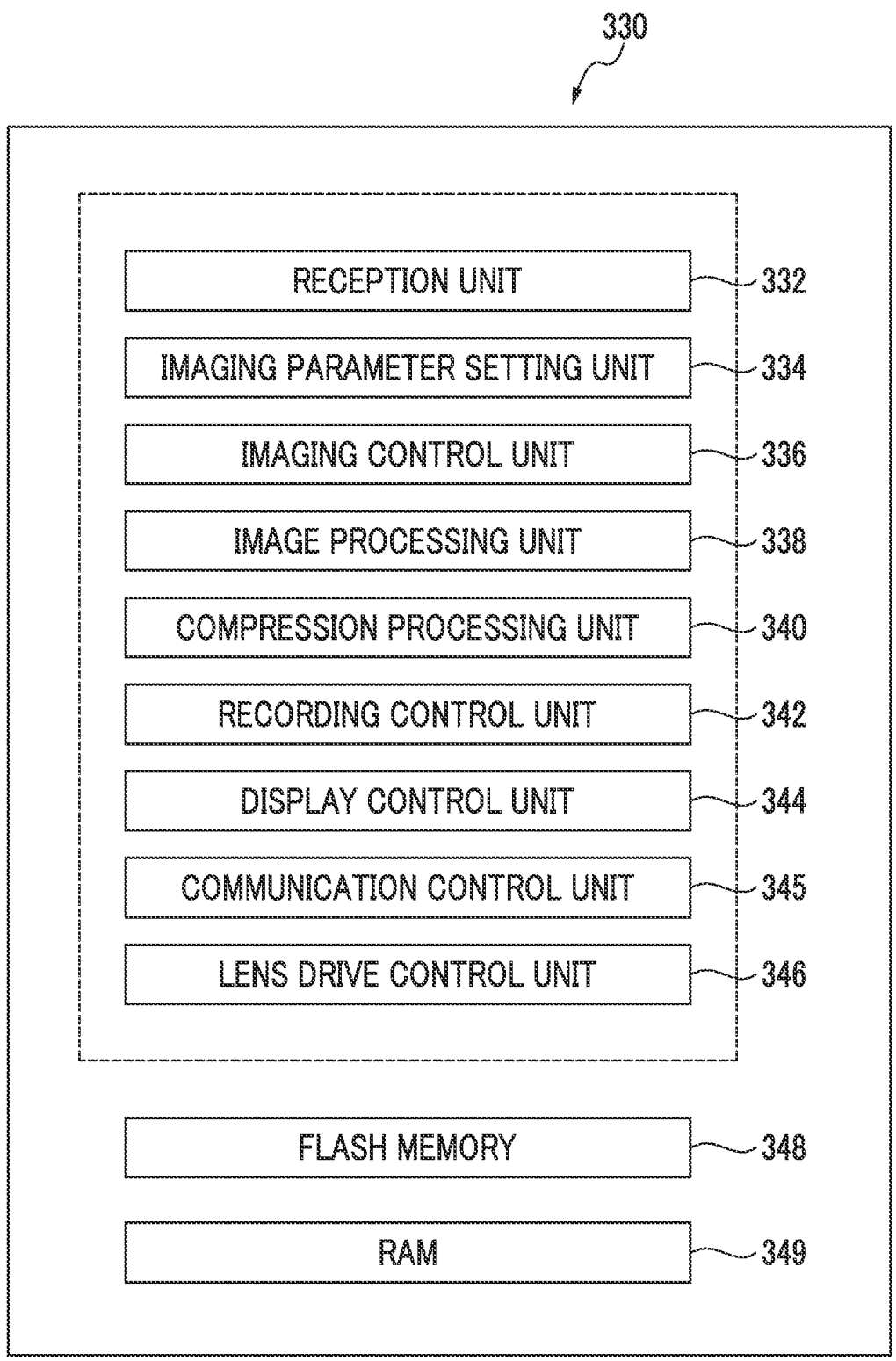
FIG. 5 is a diagram showing a functional configuration of a processor.

FIG. 5 is a diagram showing a functional configuration of the processor 330 (processor, computer). The processor 330 has functions as a reception unit 332, an imaging parameter setting unit 334, an imaging control unit 336, an image processing unit 338, a compression processing unit 340, a recording control unit 342, a display control unit 344, a communication control unit 345, and the lens drive control unit 346. The processor 330 performs processing such as capturing, image processing, compression, and recording of a moving image based on the digital image signal input from the digital signal processing unit 320. Details of the processing by the processor 330 will be described below.

The functions of the processor 330 described above can be realized by using various processors. The various processors include, for example, a central processing unit (CPU), which is a general-purpose processor that executes software (program) to realize various functions. The various processors described above include a graphics processing unit (GPU), which is a processor specialized in the image processing. The various processors described above also include a programmable logic device (PLD), which is a processor whose circuit configuration can be changed after manufacturing, such as a field programmable gate array (FPGA). Further, the various processors described above also include a dedicated electric circuit, which is a processor having a circuit configuration specifically designed to execute specific processing such as an application specific integrated circuit (ASIC).

Each function of the processor 330 may be realized by one processor or may be realized by a plurality of processors. Further, one processor may correspond a plurality of functions. Furthermore, each function of the processor 330 may be realized by a circuit, or a part of each function may be realized by a circuit and the rest may be realized by a processor.

In a case where the above processor or electric circuit executes software (program), a processor (computer) readable code of the software to be executed or data necessary for executing the software is stored in a non-transitory recording medium such as a flash memory and the processor refers to the software or data. The software stored in the non-transitory recording medium includes an imaging instruction program (program for operating imaging device) for executing the imaging instruction method according to the present embodiment. The code or data may be recorded on a non-transitory recording medium using various magneto-optical recording devices, a semiconductor memory, or the like, instead of the flash memory. The term "semiconductor memory" includes a read only memory (ROM) and an electronically erasable and programmable ROM (EEPROM), in addition to the flash memory. In a case where the processing using the software is performed, for example, a random access memory (RAM) is used as a temporary storage area.

As shown in FIG. 5, the processor 330 comprises a flash memory 348 (non-transitory recording medium, memory). A code that can be read by a computer (for example, various processors constituting the processor 330) of a program (including a program for executing the imaging instruction method according to the present embodiment) necessary for capturing, recording, and displaying an image or data (for example, frame compression or recording pattern, data of a first time or a second time described below) necessary for executing the program is recorded in the flash memory 348. Further, the processor 330 comprises a RAM 349 (memory) as a temporary storage area and a work area.

<Operation Unit>

The operation unit 350 is configured of the buttons, keys, dials, and the like shown in FIGS. 2 and 3, and the user can perform various operations such as an imaging mode setting, a setting of imaging parameters (for example, white balance, shutter speed, frame rate, compression type, and image processing such as film simulation; first imaging parameter, second imaging parameter) of the moving image, a moving image capturing instruction, and a still image capturing instruction. Further, the processor 330 can receive these user instructions. The monitor 370 (display device) may be configured of a touch panel type device and used as an operation unit.

<Recording Device>

The recording device 360 (recording device, memory) is configured of various magneto-optical recording media, a non-transitory recording medium such as a semiconductor memory, and a control circuit thereof, and can store the moving image, the still image, and the like. The recording device 360 can record the first moving image and the second moving image. As a recording medium constituting the recording device 360, a type capable of being attached to and detached from the imaging device body 300 can be used. A configuration may be employed in which a captured image (moving image, still image) can be transmitted to an external recording medium or recording device (for example, recording device or the like on the cloud, other than recording device 360) by wired and/or wireless communication via an antenna 390, under the control of the recording control unit 342 and the communication control unit 345, and the captured image may be recorded on the external recording medium or recording device.

<Monitor and Speaker>

The monitor 370 (display device) is configured by, for example, a touch panel type liquid crystal display panel, and can display a screen for imaging parameter setting, a set imaging parameter, a moving image, a still image, a remaining recording time, a warning message to the user, and the like. This message may be output by voice from the speaker 380.

<Imaging Condition Change for Moving Image and Method of Present Application>

In a case where a scene is switched during capturing of the moving image or in a case where an amount of light (type of light source, brightness, or the like) changes, the user may want to change imaging conditions (imaging parameters) such as white balance. However, the change in these settings during imaging has the following problems, for example. First, in a case where the setting is changed, there is a risk that the work (image) loses a sense of unity, and thus it may be difficult for the user to determine whether the setting is required to be changed. In particular, in a case where the imaging is performed in real time, a determination time is limited, and thus correct determination is difficult to be made. Further, there is a possibility that a timing at which the setting change is reflected in the moving image deviates from an intended timing. The technique in the related art such as JP2006-94145A described above does not take such a situation into consideration.

In view of such circumstances, the inventors of the present application have studied diligently and have obtained an idea that "a moving image under a different imaging condition (imaging parameter) captured by using the same imaging element is separately left while recording the moving image that maintains an original setting in response to a trigger (a user operation or a command from a device that triggers the start or end of processing) in the middle of the imaging". Accordingly, in a case where the moving image is edited, the user can edit the moving image with a more appropriate setting suitable for the scene. Hereinafter, specific aspects of this method will be described.

<Processing of Imaging Instruction Method (Example 1)>

<Setting of First Imaging Parameter>

Figure 6:
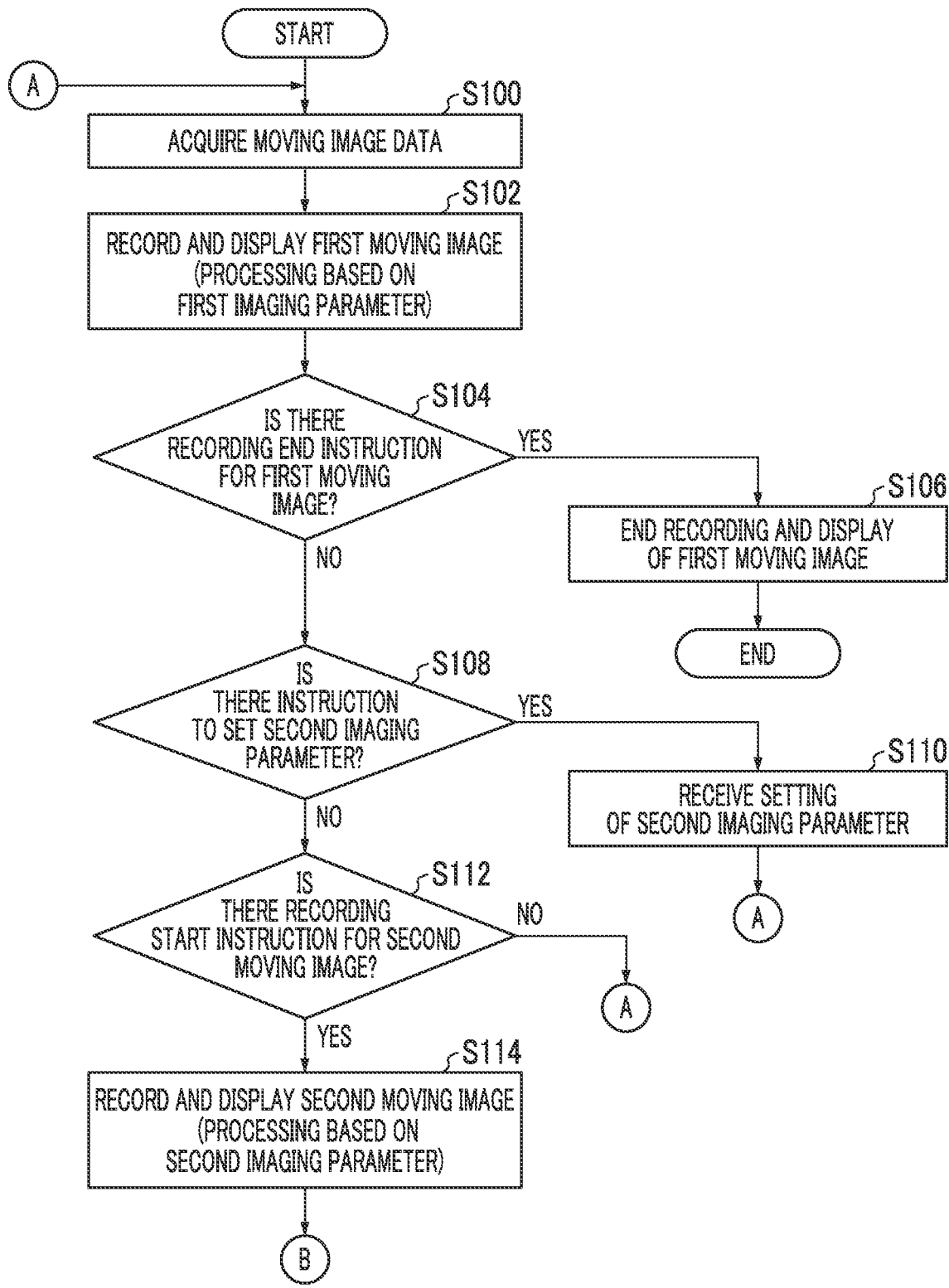
FIG. 6 is a flowchart showing processing of an imaging instruction method according to Example 1.
Figure 7:
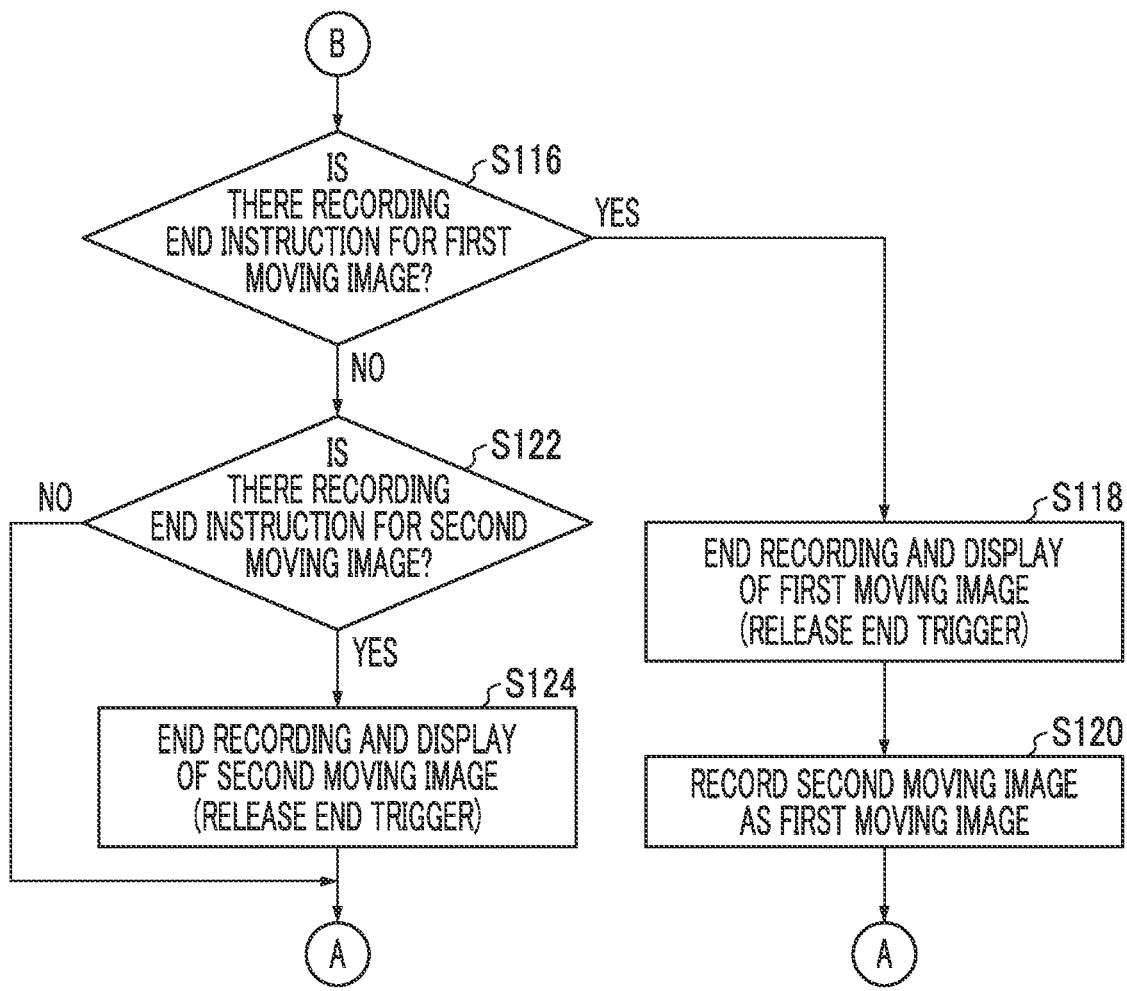
FIG. 7 is a flowchart showing the processing of the imaging instruction method according to Example 1.

FIGS. 6 and 7 are flowcharts showing processing of the imaging instruction method according to Example 1. The imaging condition (first imaging parameter) of the first moving image is assumed to be set at a point in time in a case where the processing of the flowchart is started. The term "first imaging parameter" is, for example, the shutter speed (exposure time), the frame rate, the stop, the white balance (type of light source), a content and degree of the image processing such as film simulation, and the like, but is not limited thereto. The reception unit 332 (processor) receives the setting operation for the first imaging parameter by the user, and the imaging parameter setting unit 334 (processor) sets the content of the parameter according to the received content. The user can perform the setting operation with the buttons or switches described above, and the display control unit 344 (processor) can display the setting screen on the monitor 370 (display device).

<Acquisition of Image Data>

The imaging control unit 336 (processor) acquires moving image data (single moving image data) output from the imaging element 310 (imaging unit) in response to an operation (0th operation) by the user (step S100). That is, the imaging control unit 336 causes the imaging element 310 to start capturing the first moving image. The term "imaging" includes the image processing, the compression processing, and the recording processing. For example, a full-press operation of the release button 351 can be set as the "0th operation". Further, for example, RAW data (moving image data before development processing) output from the imaging element 310 can be used as the "single moving image data". From this single moving image data, the image processing unit 338 and the compression processing unit 340 (processor) can generate the image data of the first moving image (first moving image data) and the image data of the second moving image (second moving image data).

<Recording and Displaying of First Moving Image>

The image processing unit 338, the compression processing unit 340, and the recording control unit 342 (processor) perform the image processing and the compression processing based on the first imaging parameter to record the processed image data (first moving image data) in the recording device 360 (step S102). In a period in which only the first moving image is recorded, the compression processing unit 340 may generate only an I frame, or may generate the I frame and a P frame and/or a B frame. Further, the display control unit 344 (processor) displays the first moving image on the monitor 370 (step S102). As will be described in detail below, in a period in which the first moving image and the second moving image are recorded in parallel, the display control unit 344 can simultaneously display these moving images on the monitor 370.

The reception unit 332 (processor) determines whether or not the third instruction to end the capturing of the first moving image has been received (step S104). The reception unit 332 can receive an end instruction operation (for example, pressing down of the release button 351; third operation) by the user as the third instruction. In a case where the reception unit 232 receives the third instruction (YES in step S104), the image processing unit 338, the compression processing unit 340, and the recording control unit 342 (processor) end the recording of the first moving image (step S106). In this case, the recording of the first moving image ends before the recording of the second moving image starts. As in Example 2 described below, situation data regarded as the third instruction, which is automatically generated regardless of the third operation in a case where a predetermined condition has been satisfied, may be received as the third instruction.

<Setting of Second Imaging Parameter>

The reception unit 332 (processor) determines whether or not a first operation (first instruction) by the user has been received during the capturing of the first moving image (step S108). The first operation is an operation of issuing an instruction to set the second imaging parameter different from the first imaging parameter, and the reception unit 332 can affirm the determination in a case where the above buttons or switches (for example, the function button 353) are operated. In a case where the determination is affirmed (YES in step S108), the reception unit 332 and the imaging parameter setting unit 334 (processor) set the content of the second imaging parameter according to the received content (step S110). The display control unit 344 can display the screen for setting the second imaging parameter on the monitor 370 (display device), and the user can perform the setting operation for the second imaging parameter by operating the above buttons or switches while viewing this screen. In a case where the monitor 370 is a touch panel type display device, the user can perform the setting operation via the monitor 370.

<Recording and Displaying of Second Moving Image>

The reception unit 332 (processor) determines whether or not a second operation (second instruction) by the user has been received after the reception of the first operation (first instruction) described above (step S112). The second operation is an operation of causing the imaging element 310 and the imaging control unit 336 (imaging unit) to start capturing (including image processing, compression, and recording) of the second moving image based on the second imaging parameter, and the reception unit 332 (processor) may receive the first operation and the second instruction at the same time. The image processing unit 338, the compression processing unit 340, and the recording control unit 342 (processor) perform the image processing and the compression based on the second imaging parameter on the above "single moving image data" (the same image data as the first moving image) to record the second moving image data in the recording device 360 (step S114). The second moving image may be recorded on the same recording medium (single recording medium) as the first moving image or on a recording medium separate from the first moving image (separate memory card or recording device or the like on a network).

<Control During Parallel Recording>

Figure 8:
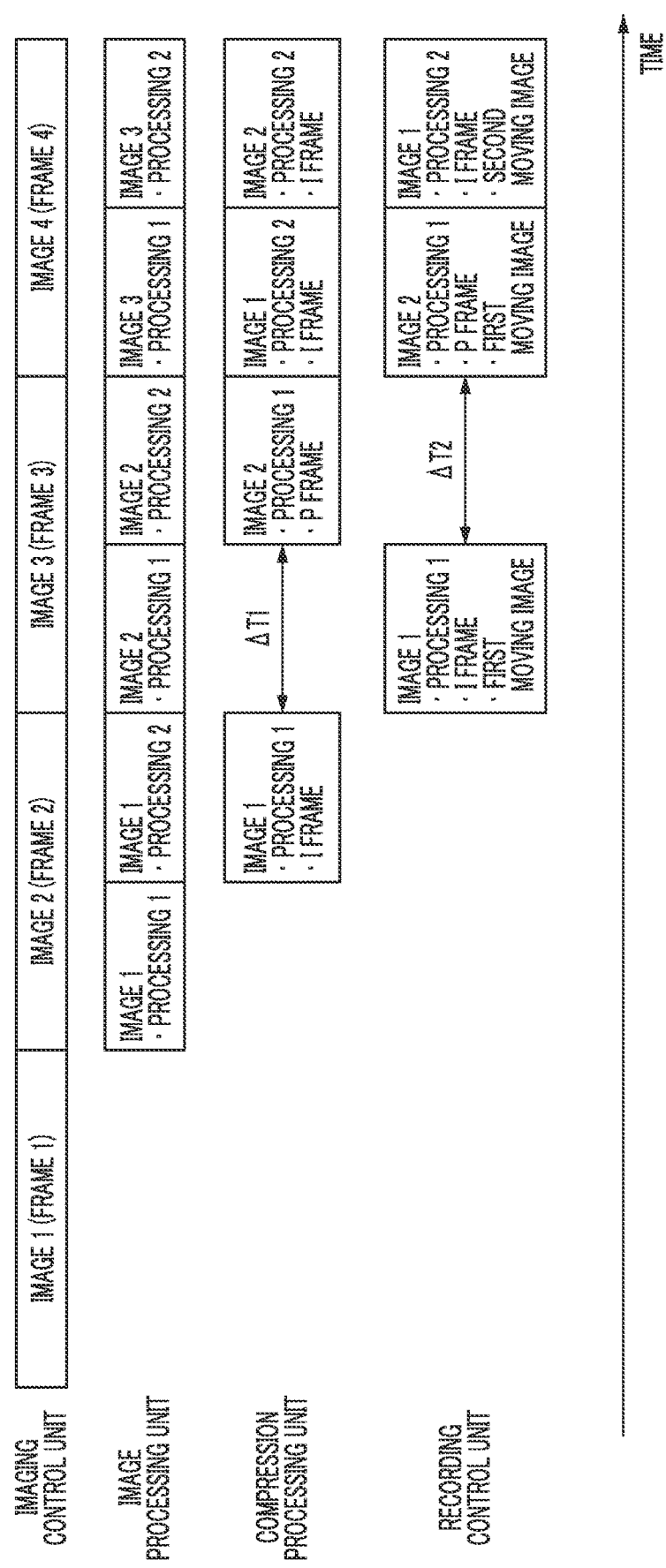
FIG. 8 is a diagram showing processing in a case where I frames and P frames are recorded in a parallel recording period of moving images.

In Example 1, the period in which the first moving image and the second moving image are recorded in parallel may be present depending on the user operation. FIG. 8 is a diagram showing processing in the imaging control unit 336, the image processing unit 338, the compression processing unit 340, and the recording control unit 342 (processor) in a case where an intraframe (I frame) and a reference frame (P frame) are recorded in such a parallel recording period. In a case where the I frame and the P frame are processed, compressed, and recorded, in the compression of the P frame, difference information between an immediately preceding frame and an input frame is generated as the P frame. For example, for an image 1 (frame 1), it is necessary to separately generate a moving image file of processing 1 (image processing based on the first imaging parameter) and a moving image file of processing 2 (image processing based on the second imaging parameter). In a case where a P frame is generated, it is necessary to compress a difference between the processing 1 of the image 1 and the processing 1 of the image 2.

However, in a case where a frame of "image 1, processing 2" is input in a blank period ΔT1, the compression processing unit 340 generates the difference information between the immediately preceding frame and the input frame as the P frame. Thus, a difference between "image 1, processing 2" and "image 2, processing 1" is generated, and appropriate image data cannot be obtained. Therefore, the "image 1, processing 2" is not input immediately, but the "image 1, processing 2" is input after waiting for creation of "image 2, processing 1". Further, the recording control unit 342 cannot record the compressed P frame until the compression of "image 2, processing 1" (P frame) is ended by the compression processing unit 340, and thus a blank period ΔT2 is produced. In this manner, in a case where the P frame is generated in addition to the I frame in the parallel recording period, the blank period is produced in the compression and recording. Thus, the image data in that period is required to be stored in the memory, and a large-capacity memory is needed.

Figure 9:
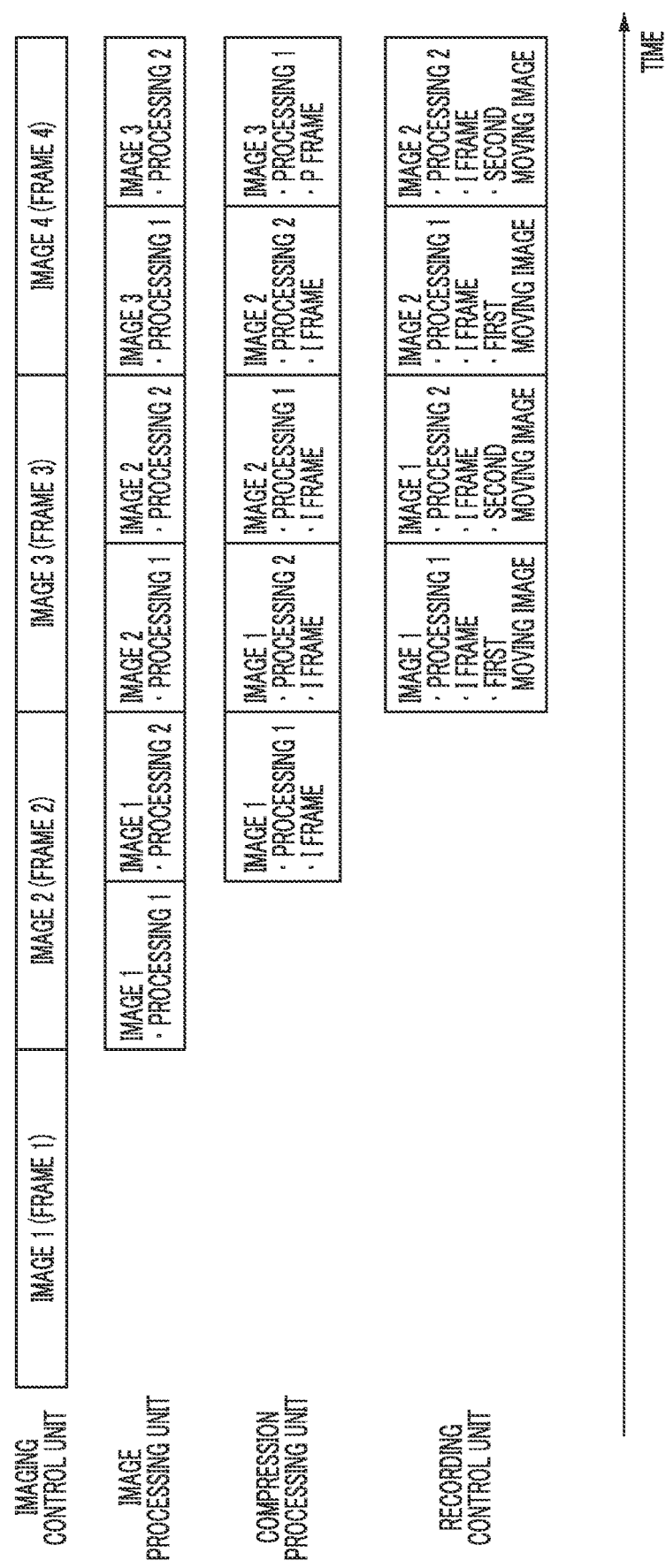
FIG. 9 is a diagram showing processing in a case where only I frames are recorded in the parallel recording period of moving images.

On the other hand, FIG. 9 is a diagram showing a state of processing in a case where only I frames are compressed and recorded in the parallel recording period of the first moving image and the second moving image. In this case, the blank period is not produced, and the restriction on the capacity of the memory is low.

In consideration of such circumstances, in the period in which the first moving image and the second moving image are recorded in parallel, the image processing unit 338, the compression processing unit 340, and the recording control unit 342 (processor) generate and record the I frames as the first moving image data and the second moving image data as shown in FIG. 9. In a case where the processor 330 comprises a plurality of compression processing units, an image of "processing 1" and an image of "processing 2" can be assigned to respective compression processing units. Thus, there is no problem in using the reference frame (P frame).

<Display of Moving Image>

Figure 10:
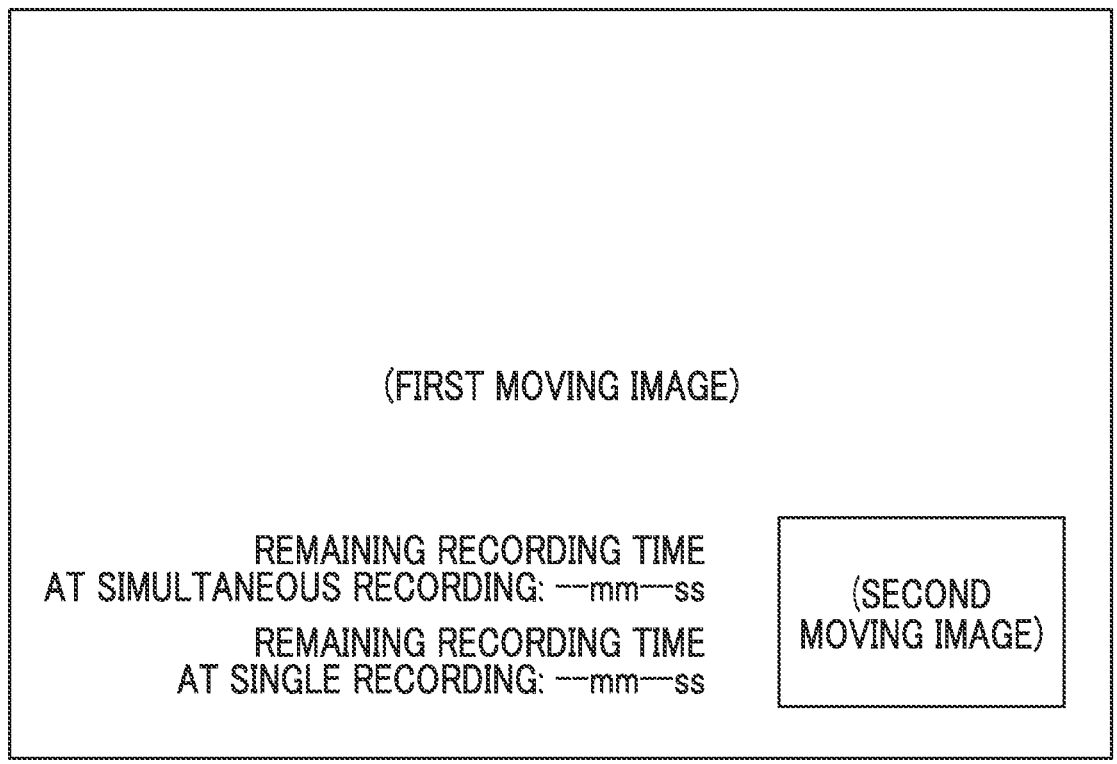
FIG. 10 is a diagram showing a state of display of moving images and remaining recording times.

The display control unit 344 (processor) displays the second moving image on the monitor 370 (step S114). The display control unit 344 can display the first moving image and the second moving image at the same time in the period in which the first moving image and the second moving image are recorded in parallel. FIG. 10 is an example of such simultaneous display, and shows a state where the second moving image is displayed in the first moving image. Instead of such a display, the first moving image may be displayed in half of a display area of the monitor 370, and the second moving image may be displayed in the other half thereof. With such simultaneous display, the user can simultaneously visually recognize the first and second moving images having different imaging parameters and end recording of an unnecessary moving image.

As also shown in FIG. 10, the recording control unit 342 and the display control unit 344 (processor) can display, on the monitor 370 (display device), a remaining recording time in a case where only one of the first moving image and the second moving image is recorded ("remaining recording time at single recording" in the same figure) and a remaining recording time in a case where both the first moving image and the second moving image are recorded ("remaining recording time at simultaneous recording" in the same figure).

<Recording End of First Moving Image>

The reception unit 332 (processor) determines whether or not the third instruction to end the capturing of the first moving image has been received (step S116). The reception unit 332 receives the third instruction by the user and the situation data, which is regarded as the third instruction in a case where the predetermined condition has been satisfied, as the third instruction. In Example 1, the reception unit 332 can receive the operation (third operation) of the release button 351 and other buttons and dials as the third instruction. In Example 2 described below, information indicating the third instruction is generated and received based on the switching of the imaging scene.

In a case where the determination in step S116 is affirmed, the image processing unit 338, the compression processing unit 340, and the recording control unit 342 (processor) end the recording (including the image processing and the compression processing) of the first moving image and release the correspondence between the third operation and the third instruction for the buttons or switches (step S118). For example, the correspondence to "the recording of the first moving image ends in a case where the release button 351 is pressed down" is released.

In a case where the third instruction (instruction to end the capturing of the first moving image) has been received in a state where a fourth instruction (instruction to end the capturing of the second moving image) has not been received, the image processing unit 338, the compression processing unit 340, and the recording control unit 342 (processor) end the capturing of the first moving image and record the second moving image as the first moving image after the third instruction has been received (step S120). For example, the second moving image can be recorded in continuation of the image file of the first moving image, a file name of the image file can be set such that the continuation of the first moving image can be recognized, the correspondence between the operation of the buttons or switches and the processing (start and end of capturing) and the like can be made the same as the first moving image, the display of the moving image and other user interfaces can be made the same as the first moving image, and the like.

In step S120, in a case where the correspondence between the operation of the buttons or switches for the second moving image and the processing (start and end of capturing) and the like is made the same as the first moving image, there is a possibility that a trigger for the recording end (third instruction) continues to be issued depending on the user operation (for example, in a case where a button to which the recording end is assigned is continuously pressed down) and the recording of the second moving image in which the recording has been started as the first moving image ends immediately. Therefore, in step S118, the correspondence between the third operation and the third instruction is temporarily released.

The image processing unit 338, the compression processing unit 340, and the recording control unit 342 (processor) may generate and record only the I frame in a period in which only the second moving image is recorded after the recording end of the first moving image, or may generate and record the I frame and the P frame and/or the B frame.

<Recording End of Second Moving Image>

On the other hand, in a case where there is no recording end instruction for the first moving image in step S116, the reception unit 332 (processor) determines whether or not the fourth instruction to end the capturing of the second moving image has been received (step S122) and continues the recording of the second moving image until the determination is affirmed (while YES). The reception unit 332 can receive the user operation on the predetermined buttons or switches, such as pressing down of the function button 353, as the fourth instruction. In a case where the determination in step S122 is affirmed, the image processing unit 338, the compression processing unit 340, and the recording control unit 342 (processor) end the recording (including image processing and compression processing) and display of the second moving image (step S124). Similarly to the case of the first moving image (step S118), the correspondence between the user operation and the fourth instruction (instruction to end the capturing of the second moving image; end trigger) may be released (step S124).

With the processing of steps S122 and S124, the user can end only the recording of the second moving image during the parallel recording of the first moving image and the second moving image.

Figure 11A:
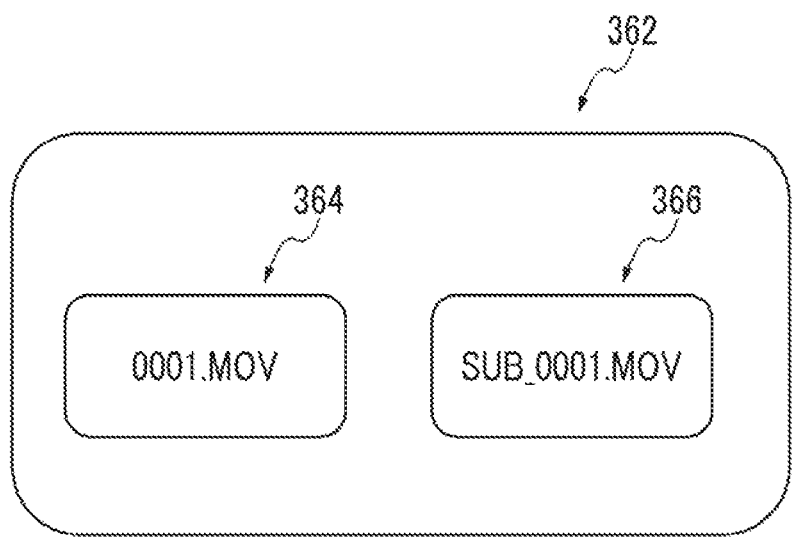
FIG. 11A and FIG. 11B are diagrams showing a state where a first moving image and a second moving image are recorded in a file.
Figure 11B:
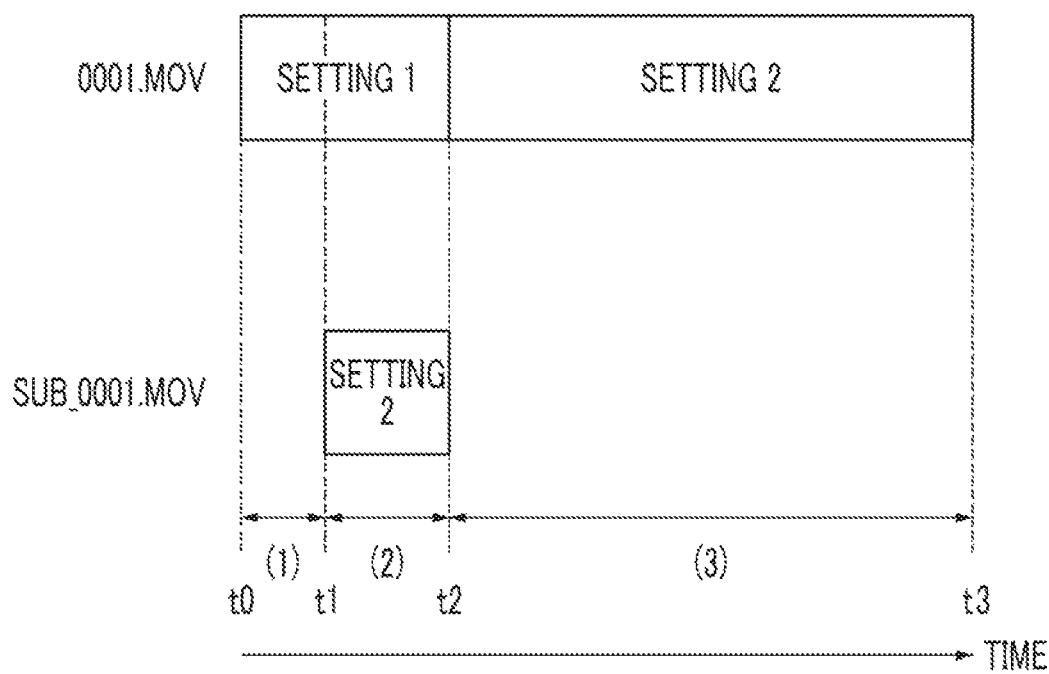

FIG. 11A and FIG. 11B are diagrams showing a state where the first moving image and the second moving image are recorded in a file (the moving image can be displayed in the same manner as in FIG. 10). FIG. 11A shows a state where a first recording folder 364 and a second recording folder 366 are created on a memory card 362 (non-transitory recording medium, one aspect of "single recording medium") attached to the recording device 360 and a moving image file "0001.MOV" and a moving image file "SUB_0001.MOV" are respectively recorded on the first recording folder 364 and the second recording folder 366. A part of the file name (part of "0001") is common to these moving image files, and thus the user can easily grasp the relevance of the moving image files.

FIG. 11B shows recording contents of the file in each period. In a period (1) from a time point t0 to a time point t1, the image processing unit 338, the compression processing unit 340, and the recording control unit 342 (processor) generate and record the moving image (first moving image) based on the first imaging parameter in the moving image file "0001.MOV". Each of these units starts the recording of the second moving image in the moving image file "SUB_0001.MOV" at the time point t1 (timing at which the second instruction has been received) (step S114), and records the moving image (first moving image) based on the first imaging parameter ("setting 1") in the moving image file "0001.MOV" and records the moving image (second moving image) based on the second imaging parameter ("setting 2") in the moving image file "0001.MOV" in a period (2) from the time point t1 to a time point t2. The image processing unit 338, the compression processing unit 340, and the recording control unit 342 (processor) end the recording of the first moving image at the time point t2 (timing at which the third instruction has been received) (step S118), and records the second moving image as the first moving image in a period (3) from the time point t2 to a time point t3 (step S112). Specifically, each of the above units records the second moving image based on the second imaging parameter in the moving image file "0001.MOV" in which the first moving image has been recorded until the time point t2 in the period (3) from the time point t2 to the time point t3. That is, the image processing unit 338, the compression processing unit 340, and the recording control unit 342 (processor) record the second moving image in association with the first moving image recorded from the second instruction at the time point t1 to the third instruction at the time point t2.

Figure 14:
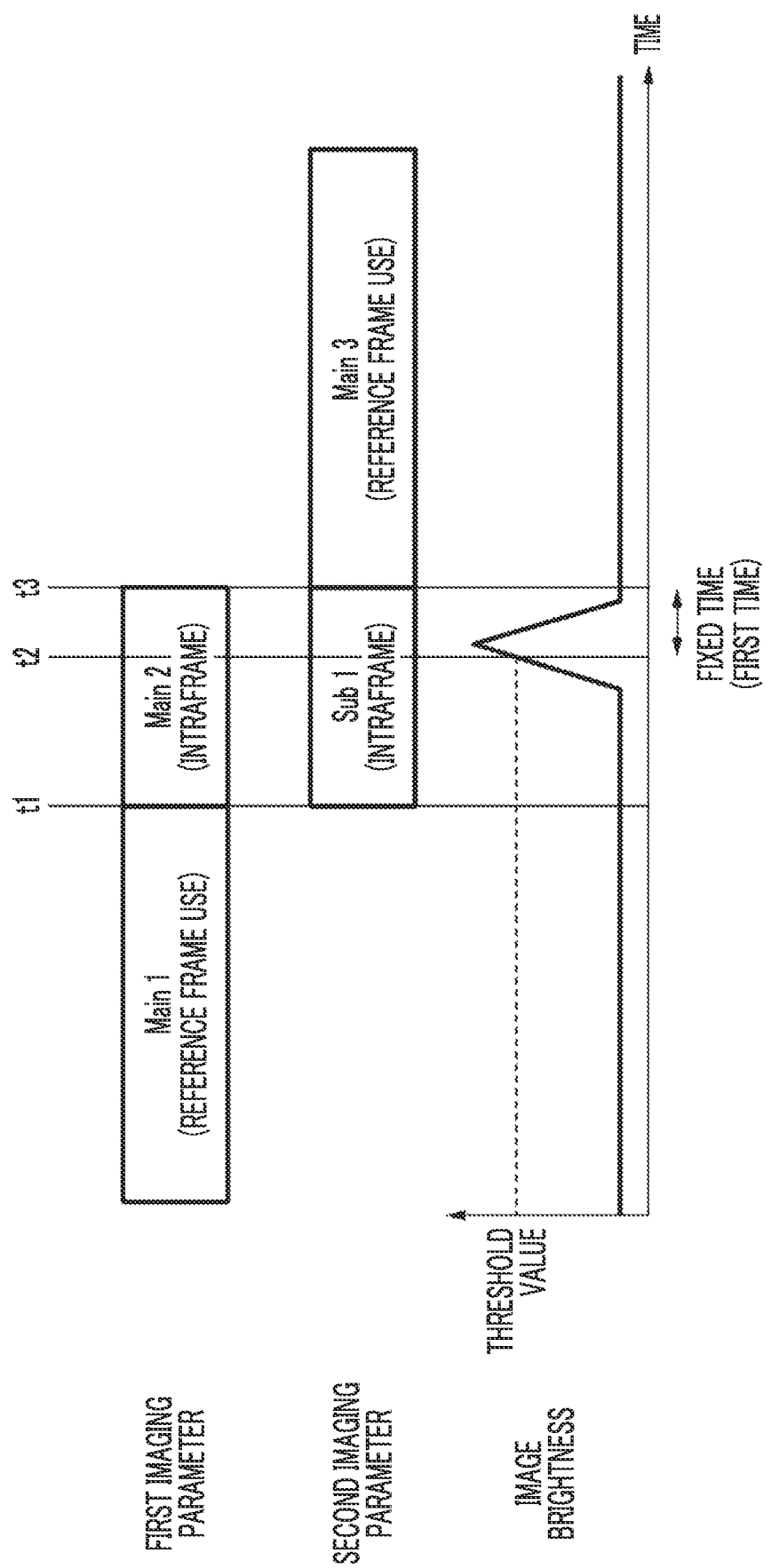
FIG. 14 is a diagram showing a state of parallel recording before and after switching of an imaging scene.

In the example shown in FIG. 11, the moving image based on the second imaging parameter is recorded after the time point t2 in the moving image file "0001.MOV" in which the moving image based on the first imaging parameter has been recorded until the time point t2. However, the image processing unit 338, the compression processing unit 340, and the recording control unit 342 (processor) may continue to record the second moving image in the moving image file "SUB_0001.MOV" even after the time point t2 (refer to example of FIG. 14).

As described above, according to Example 1, the first moving image and the second moving image are recorded in parallel before and after the switching of the imaging parameter (period (2) in example of FIG. 11). Therefore, it is possible to separately leave the moving image (second moving image based on the second imaging parameter) having a different setting while continuing to keep the moving image (first moving image based on the first imaging parameter) that maintains the original setting. Accordingly, the user can select a moving image having a better setting suitable for the imaging scene in editing the moving image. Specifically, for example, the user can join the first moving image and the second moving image at a desired timing.

As described above, according to Example 1, the user can easily record a plurality of moving images having different imaging parameters.

<Processing of Imaging Instruction Method (Example 2)>

Figure 12:
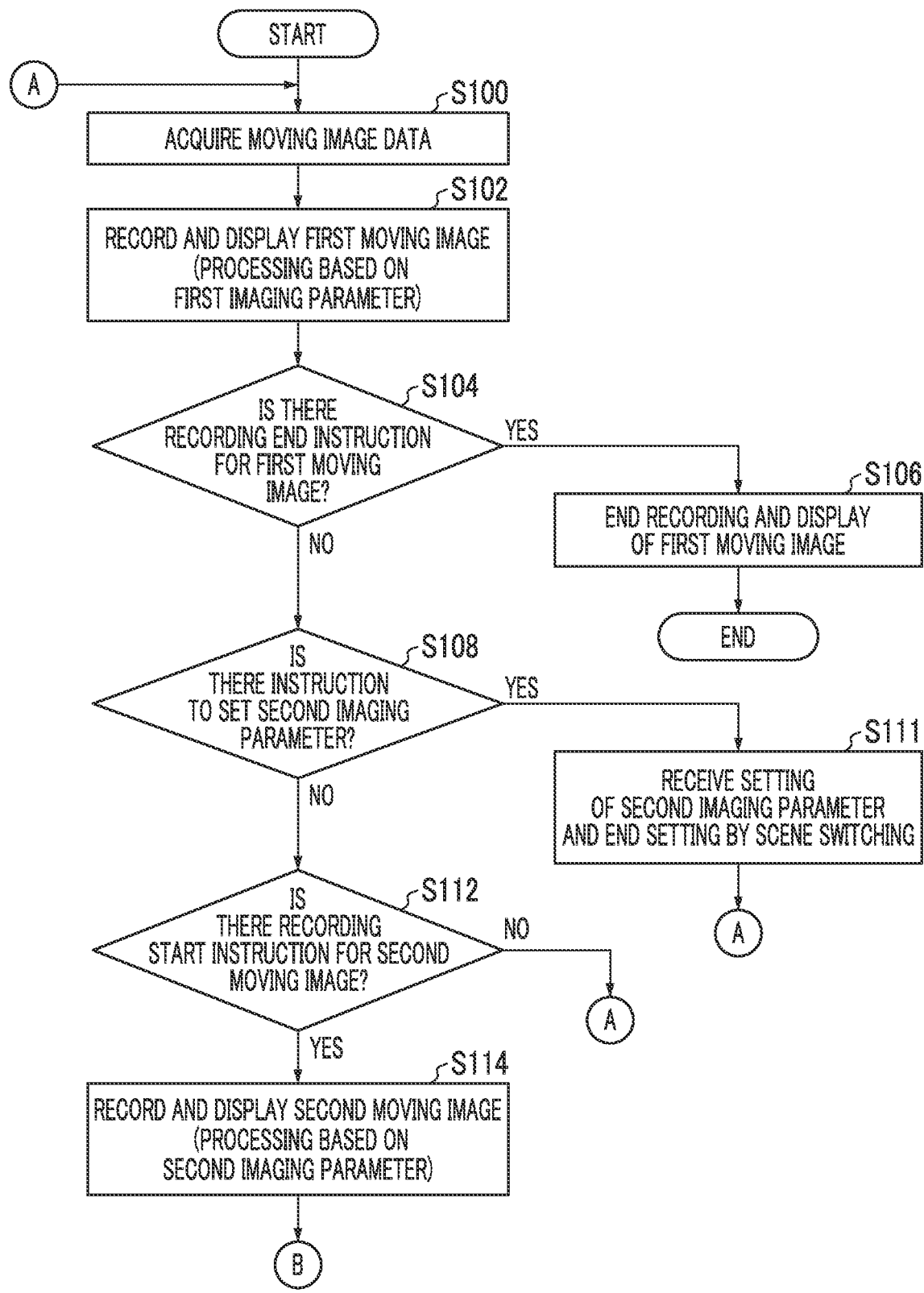
FIG. 12 is a flowchart showing processing of an imaging instruction method according to Example 2.

Next, processing of the imaging instruction method in Example 2 will be described with reference to flowcharts of FIGS. 12 and 13. In Example 2, as described below, the situation data regarded as the user operation in a case where the predetermined condition has been satisfied is received as the third instruction, and the recording of the first moving image is ended. Regarding the flowcharts of FIGS. 12 and 13, the same step numbers are assigned to steps for performing the same processing as those of FIGS. 6 and 7, and detailed description thereof is omitted.

The reception unit 332 (processor) receives the setting of the recording end of the second moving image by scene switching (step S111). The reception unit 332 can receive, for example, the user operation regarding a setting of an imaging condition (predetermined parameter) that is a reference for the scene switching or a setting of the first time, the second time, or the like, which will be described below.

In a case where the reception unit 332 receives the recording start instruction (second operation by the user; second instruction) for the second moving image (YES in step S112), the image processing unit 338, the compression processing unit 340, and the recording control unit 342 (processor) starts the capturing (including image processing, compression, and recording) of the second moving image (step S114). This capturing start corresponds to the time point t1 in FIG. 14 (diagram showing a state of parallel recording before and after imaging scene switching). In the figure, a period from a time point t1 to a time point t3 is a period in which the first moving image and the second moving image are recorded in parallel, and only I frames (intraframes) of both the first moving image and the second moving image are recorded, as described above.

Figure 13:
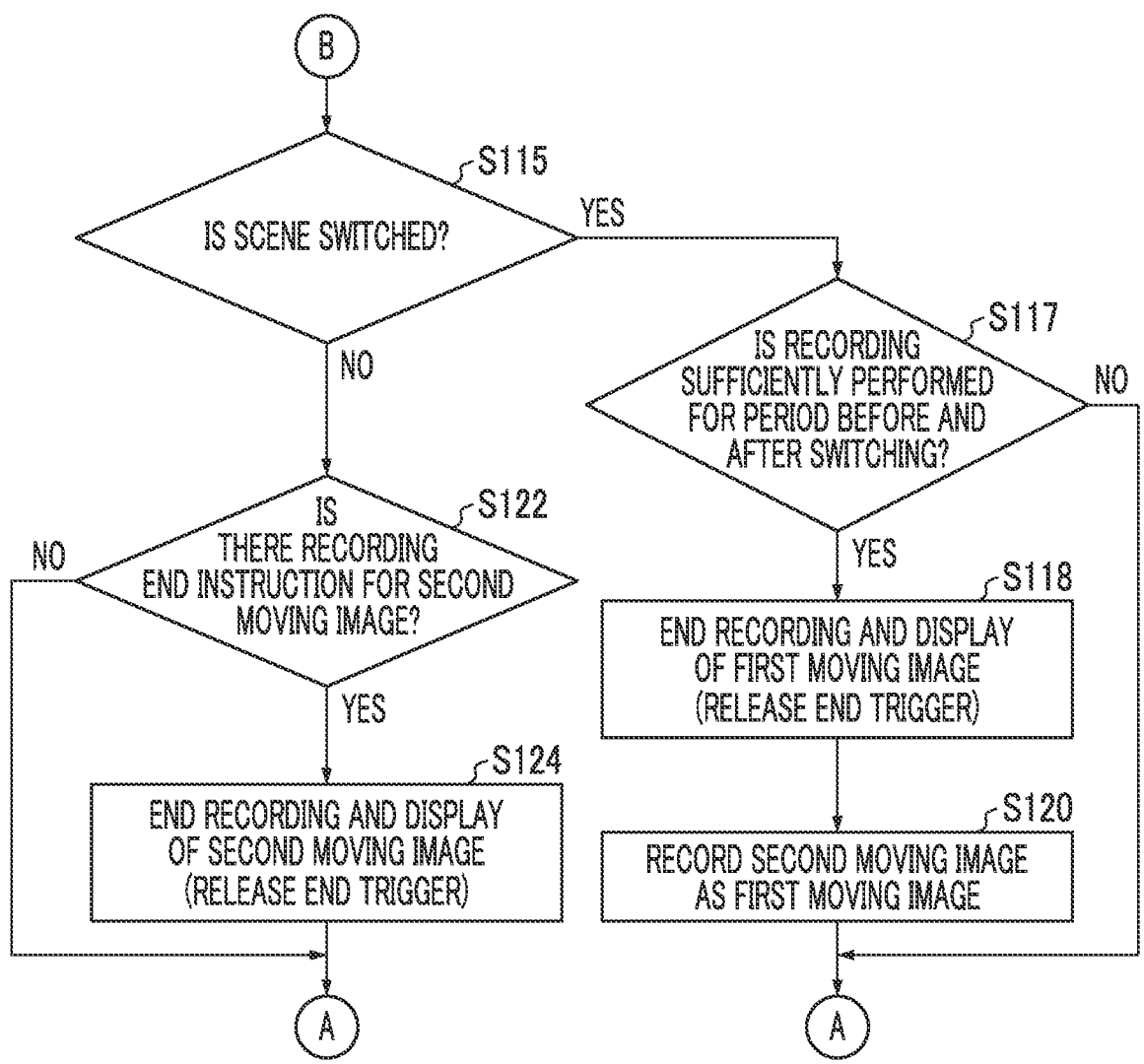
FIG. 13 is a flowchart showing the processing of the imaging instruction method according to Example 2.

The image processing unit 338 (processor) detects the scene of the moving image and determines whether or not the scene switching has occurred (step S115 in FIG. 13). The image processing unit 338 can determine that the scene switching has occurred in a case where a predetermined parameter (for example, brightness of field of view or the like) exceeds a threshold value (time point t2 in FIG. 14). For example, the above case includes a case where the light source is changed from a fluorescent lamp to an incandescent lamp in a room, a case where going out is made from a relatively dark room to a bright outdoor place in the daytime, and a case where the brightness of the field of view significantly changes and determination is made that "scene switching has occurred" in a case where movement is made from the sun to the shade even in an outdoor place or the like. The image processing unit 338 may determine the switching with a parameter other than the brightness.

In a case where the switching occurs (YES in step S115), the recording control unit 342 (processor) determines "whether or not the parallel recording has been sufficiently performed for the period before and after the scene switching" (whether or not the predetermined condition has been satisfied) (step S117). For example, in a case where the first time elapses after the scene is switched (time point t3 in FIG. 14), the recording control unit 342 determines that "the parallel recording has been sufficiently performed" (the predetermined condition has been satisfied) and generate data to end the capturing of the first moving image (situation data regarded as the third instruction) regardless of the user operation. Accordingly, the image processing unit 338, the compression processing unit 340, and the recording control unit 342 (processor) end the recording of the first moving image in the same manner as in the flowchart of FIG. 7, and an end condition ("predetermined condition" as end condition) is released (step S118).

As described above, in Example 3, since the capturing of the first moving image is automatically ended in accordance with the switching of the scene, the user can concentrate on the imaging without performing an extra operation. Further, in editing after the imaging, the user can combine the first moving image ("Main2" in FIG. 14) and the second moving image ("Sub1" in FIG. 14) during the parallel recording period into one at an appropriate (desired) timing.

Each unit described above records the second moving image as the first moving image (step S120). In a case where the scene after the switching is continued for the second time, the recording control unit 342 may determine that "the parallel recording has been sufficiently performed" ("predetermined condition has been satisfied"). The reason why the determination is made based on the continuation time of the scene in this manner is that the processing may not follow immediately after the scene switching and thus brightness or tint of the image may not be stable.

In a case where the scene switching does not occur (NO in step S115), the image processing unit 338, the compression processing unit 340, the recording control unit 342, and the display control unit 344 continue to record and display the second moving image until the reception unit 332 receives the recording end instruction for the second moving image (while NO in step S122) and end the recording and display in a case where the reception unit 332 has received the recording end instruction for the second moving image (step S124). In step S124, the correspondence between the user operation and the fourth instruction (instruction to end the capturing of the second moving image; end trigger) may be released.

As described above, also in Example 2, the user can easily record a plurality of moving images having different imaging parameters, as in Example 1.

<Processing of Imaging Instruction Method (Example 3)>

Figure 15:
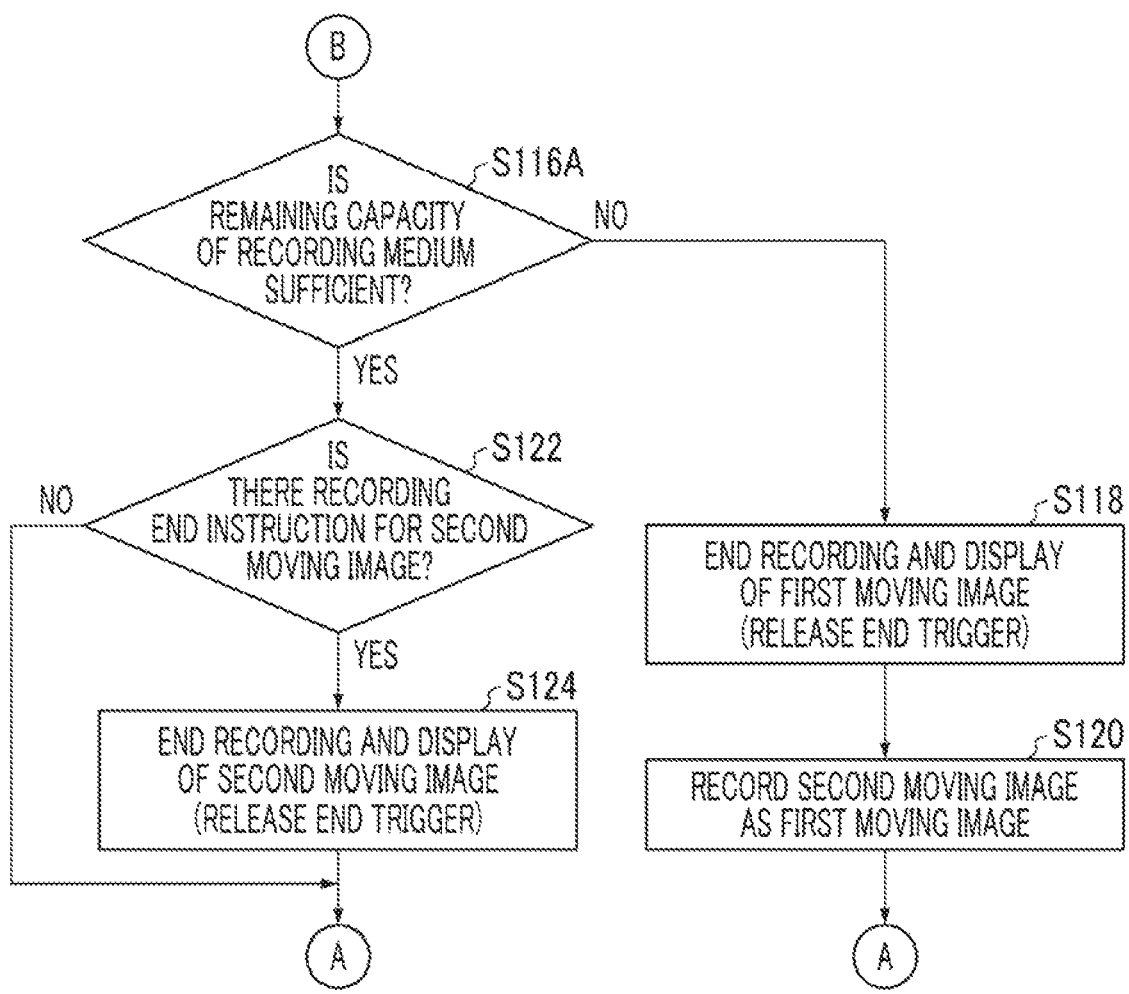
FIG. 15 is a flowchart showing processing of an imaging instruction method according to Example 3.

FIG. 15 is a flowchart showing processing of the imaging instruction method in Example 3 (since the processing in steps S100 to S114 is the same as the flowchart of FIG. 6, the description thereof is omitted). In Example 3, as described below, the situation data for ending the recording of the first moving image is generated according to a remaining capacity of the recording medium, regardless of the user operation.

In step S116A, the recording control unit 342 (processor) determines whether or not the remaining capacity of the recording medium for recording the first moving image is sufficient. For example, in a case where the remaining capacity of the memory card attached to the recording device 360 is larger than a data size in a case where the first moving image is recorded for a remaining scheduled imaging time, the recording control unit 342 can determine that "remaining capacity is sufficient" (YES in step S116A; in this case, processing proceeds to step S122). In a case where there is no capacity restriction (or very low), such as in a recording device or the like on the cloud, the recording control unit 342 can determine that "remaining capacity of the recording medium is sufficient". Further, the recording control unit 342 can grasp the scheduled imaging time by a method such as using a value set in advance or causing the user to input a value before the start of capturing. Further, the recording control unit 342 can calculate the data size based on the scheduled imaging time, a compression rate, or the like.

In a case where the remaining capacity of the recording medium for recording the first moving image is not sufficient (for example, in a case where the remaining capacity of the memory card is smaller than the data size in a case where the first moving image is recorded for the remaining scheduled imaging time; NO in step S116A), the recording control unit 342 determines that "predetermined condition" has been satisfied and generates the situation data for ending the recording of the first moving image (ending the parallel recording), regardless of the user operation. Accordingly, it is possible to reduce the possibility that the capacity of the recording medium is insufficient and the imaging cannot be performed for a desired time.

As described above, also in Example 3, the user can easily record a plurality of moving images having different imaging parameters, as in Examples 1 and 2.

In the first embodiment described above, the processing (image processing, compression processing) based on the first imaging parameter and the second imaging parameter is performed on the single moving image data (RAW data or the like) and the recording is performed. However, two imaging elements may be provided, and the processing (image processing, compression processing) based on the first imaging parameter and the second imaging parameter may be performed on each of pieces of moving image data output from the two imaging elements and the recording may be performed.

<Modification Example of Operation and Instruction for Imaging Device>

Figure 16:
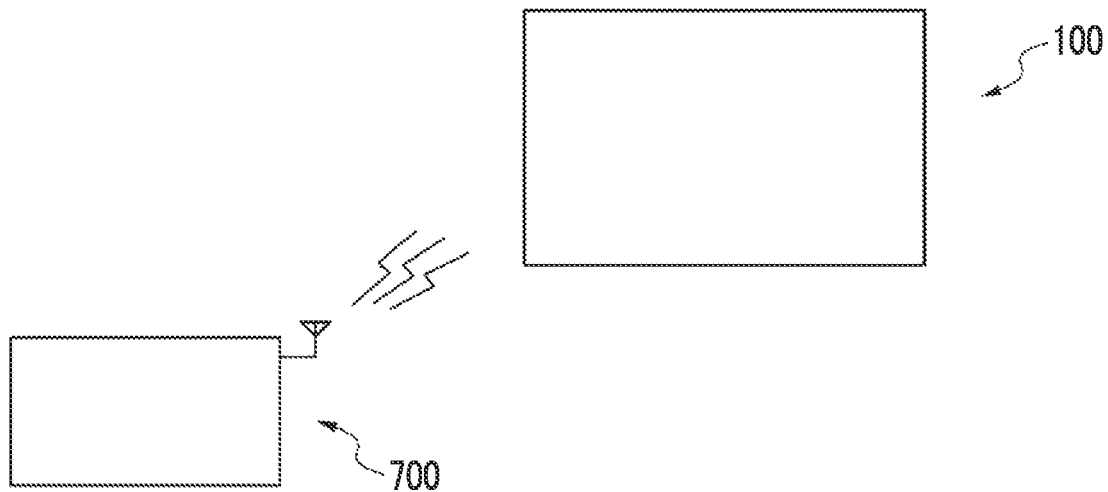
FIG. 16 is a diagram showing a state where the imaging device is controlled by using a remote controller.

In Examples 1 to 3 described above, the user directly performs the setting of the imaging parameter or the imaging instruction to the imaging device 100. However, the operation or the instruction to the imaging device 100 may be performed by using a remote controller. FIG. 16 is a diagram showing a state where the imaging device 100 is controlled by using a remote controller 700 (imaging instruction device), and FIG. 17 is a diagram showing a configuration of the remote controller 700.

Figure 17:
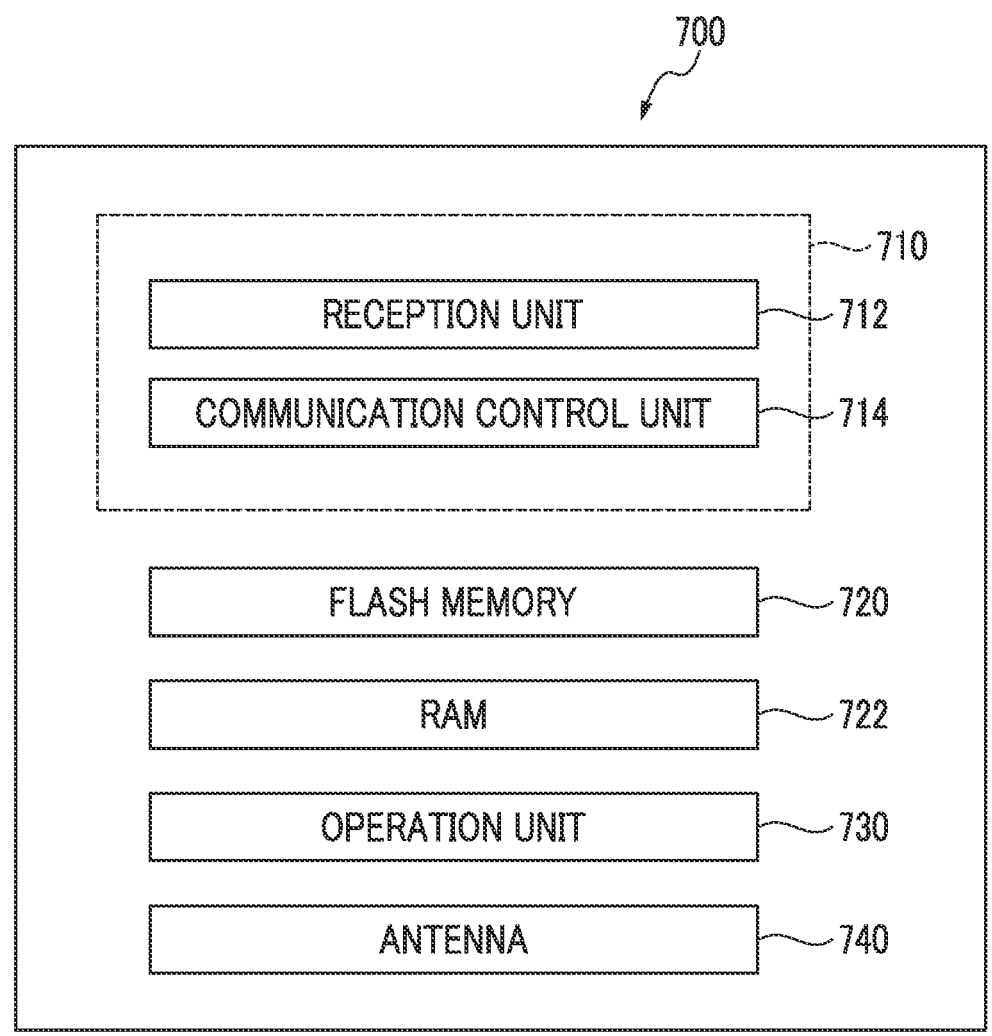
FIG. 17 is a diagram showing a configuration of the remote controller.

As shown in FIG. 17, the remote controller 700 comprises a processor 710 (processor) including a reception unit 712 and a communication control unit 714, a flash memory 720, a RAM 722, an operation unit 730, and an antenna 740 for wireless communication. The user operates the operation unit 730 (buttons or switches) to perform various operations (imaging parameter setting instruction, recording start/end instruction for moving image, and the like), and the reception unit 712 receives the operation. The communication control unit 714 issues an instruction to the imaging device 100 according to the imaging instruction program according to the present invention, which is stored in the flash memory 720 (non-transitory recording medium, memory). The imaging instruction program causes the processor 710 to execute the imaging instruction (first to third instructions; each piece of processing of the imaging instruction method according to the present invention) to the imaging unit (specifically, each unit of the imaging element 310 and the processor 330) of the imaging device 100. In a case where the processing is performed, the RAM 722 is used as a work area and a temporary recording area. Each piece of processing of the imaging instruction method is the same as that of Examples 1 to 3. The communication between the remote controller 700 and the imaging device 100 may be wired.

With such a configuration, the user also can easily record a plurality of moving images having different imaging parameters, as in Examples 1 to 3 described above.

Second Embodiment

Although the imaging device 100 which is a digital camera is described in the first embodiment, the configuration of the imaging device is not limited thereto. Another imaging device may be, for example, a built-in type or external type camera for personal computer (PC) or a mobile terminal device having an imaging function as described below.

Examples of the mobile terminal device which is an embodiment of the imaging device according to the present invention include mobile phones or smartphones, personal digital assistant (PDA), portable game machines, and smartwatches. Hereinafter, a smartphone will be described as an example in detail with reference to drawings.

Figure 18A:
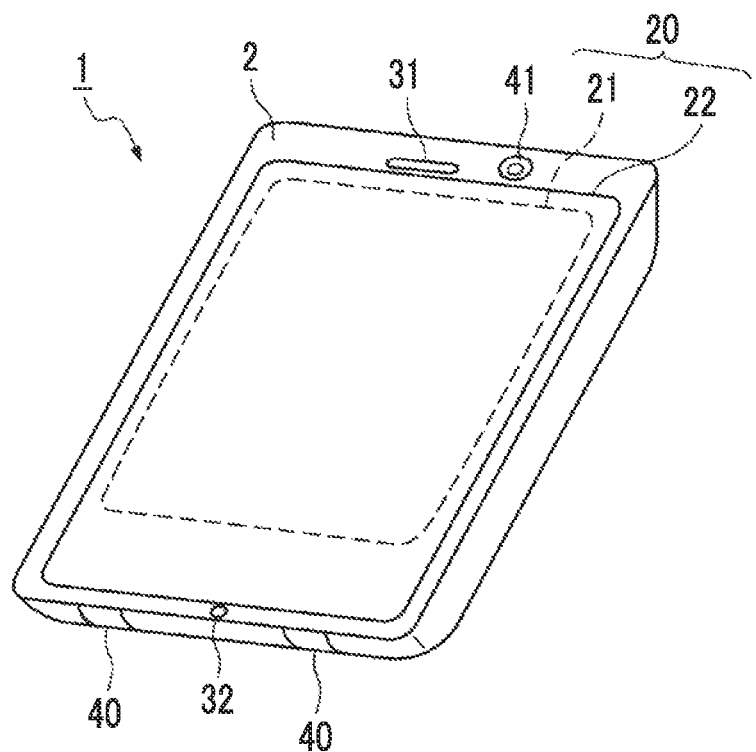
FIG. 18A and FIG. 18B are external views of a smartphone according to a second embodiment.
Figure 18B:
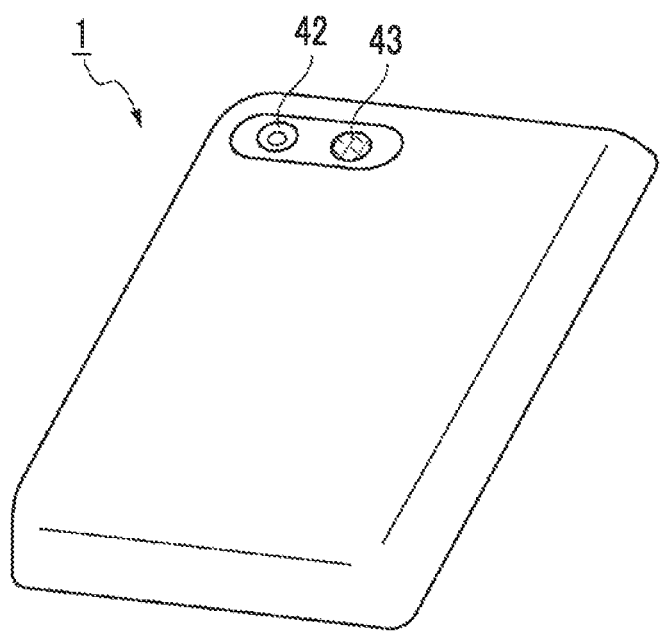

FIG. 18A and FIG. 18B are external views of a smartphone 1 (imaging device) according to a second embodiment. FIG. 18A is a front view, and FIG. 18B is a rear view. The smartphone 1 shown in FIG. 18A and FIG. 18B has a flat housing 2 and comprises a display input unit 20 in which a display panel 21 (display device) as a display unit and an operation panel 22 (operation unit) as an input unit are integrated on one surface of the housing 2. Further, the housing 2 comprises a speaker 31 (speaker), a microphone 32, an operation unit 40 (operation unit), camera units 41 and 42 (imaging device), and a strobe 43. A configuration of the housing 2 is not limited thereto. For example, a configuration in which the display unit and the input unit are independent may be employed, or a configuration having a folding structure or a slide mechanism may be employed.

Figure 19:
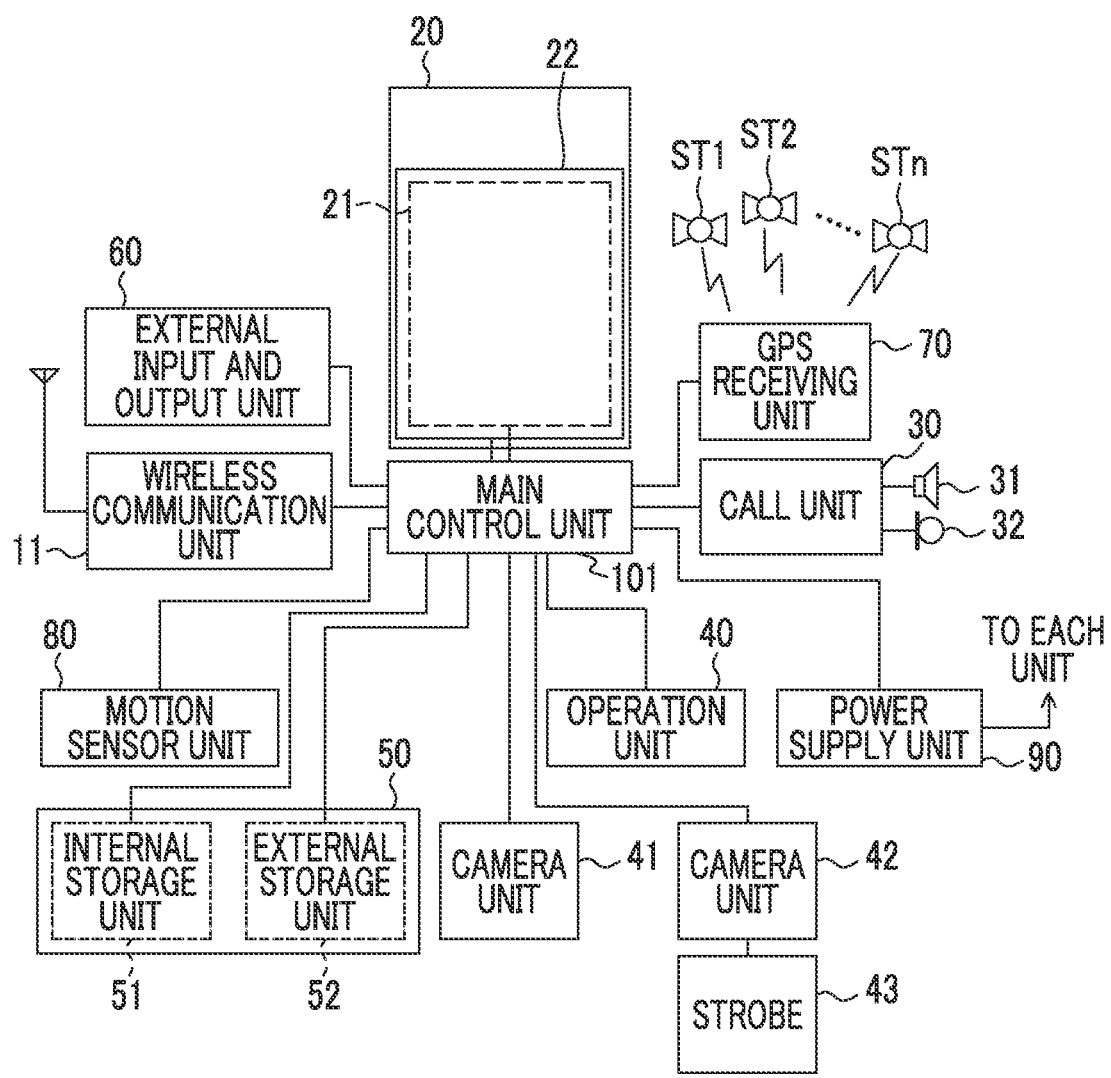
FIG. 19 is a diagram showing a schematic configuration of the smartphone.

FIG. 19 is a diagram showing a schematic configuration of the smartphone 1. As shown in FIG. 19, the smartphone 1 comprises a wireless communication unit 11, the display input unit 20, a call unit 30, the operation unit 40, the camera units 41 and 42, the strobe 43, a storage unit 50, an external input and output unit 60, a global positioning system (GPS) receiving unit 70, a motion sensor unit 80, and a power supply unit 90. Further, the smartphone 1 comprises a main control unit 101 (processor). A wireless communication function for performing mobile wireless communication via a base station device and a mobile communication network is provided as a main function of the smartphone 1.

The wireless communication unit 11 performs wireless communication with the base station device accommodated in the mobile communication network in response to an instruction from the main control unit 101. Using such wireless communication, various pieces of file data such as voice data and image data, e-mail data, and the like are transmitted and received, and Web data, streaming data, and the like are received.

The display input unit 20 is a so-called touch panel in which an image (still image and/or moving image), character information, or the like is displayed to visually transmit information to the user and a user operation on the displayed information is detected under control of the main control unit 101, and comprises the display panel 21 and the operation panel 22.

In the display panel 21, a liquid crystal display (LCD), an organic light-emitting diode (OLED), or the like is used as a display device. The operation panel 22 is a device that is placed such that an image displayed on a display surface of the display panel 21 is visually recognizable and detects one or a plurality of coordinates operated by a finger of the user or a conductor such as a pen. In a case where such a device is operated by the finger of the user or the conductor such as the pen, the operation panel 22 outputs, to the main control unit 101, a detection signal generated due to the operation. Next, the main control unit 101 detects an operation position (coordinates) on the display panel 21 based on the received detection signal.

As shown in FIG. 18A and FIG. 18B, although the display panel 21 and the operation panel 22 of the smartphone 1 exemplified as an embodiment of the imaging device of the present invention integrally constitute the display input unit 20, the operation panel 22 is disposed so as to completely cover the display panel 21. In a case where such a disposition is employed, the operation panel 22 may comprise a function of detecting the user operation even in an area outside the display panel 21. In other words, the operation panel 22 may comprise a detection area (hereinafter referred to as display area) for an overlapping portion that overlaps the display panel 21 and a detection area (hereinafter referred to as non-display area) for the other outer edge portion that does not overlap the display panel 21.

The call unit 30 comprises the speaker 31 and the microphone 32. The call unit 30 can convert a voice of the user input through the microphone 32 into voice data that can be processed by the main control unit 101 and output the converted voice data to the main control unit 101, and can decode the voice data received by the wireless communication unit 11 or the external input and output unit 60 and output the decoded voice data from the speaker 31. Further, as shown in FIG. 18A and FIG. 18B, it is possible to mount the speaker 31 on the same surface as a surface on which the display input unit 20 is provided, and to mount the microphone 32 on a side surface of the housing 2, for example.

The operation unit 40 is a hardware key using a key switch or the like and receives the instruction from the user. For example, as shown in FIG. 18A and FIG. 18B, the operation unit 40 is a push-button type switch that is mounted on the side surface of the housing 2 of the smartphone 1, is turned on in a case of being pressed with a finger or the like, and is turned off by restoring force of a spring or the like in a case where the finger is released.

The storage unit 50 (recording device, memory) stores a control program (for example, imaging instruction program causing the main control unit 101 to execute the imaging instruction method according to the present embodiment) or control data (may include the information such as the first time, the second time, and the like described above) of the main control unit 101, application software, address data in which a name, a telephone number, and the like of a communication partner are associated, data of transmitted and received e-mails, Web data downloaded by Web browsing, or downloaded content data, and temporarily stores streaming data or the like. Further, the storage unit 50 stores the moving images (first moving image, second moving image) captured by the imaging instruction method of the present embodiment. The storage unit 50 is configured of an internal storage unit 51 built into the smartphone and an external storage unit 52 having a slot for an attachable and detachable external memory. Each of the internal storage unit 51 and the external storage unit 52 constituting the storage unit 50 is formed by using a known storage medium.

The external input and output unit 60 serves as an interface with all external devices connected to the smartphone 1. The smartphone 1 is directly or indirectly connected to another external device via the external input and output unit 60 by communication or the like. Examples of the units for communication and the like include a universal serial bus, an IEEE 1394, and a network (for example, a wired LAN or a wireless LAN). Further, Bluetooth (registered trademark), radio frequency identification (RFID), infrared data association (registered trademark), and the like can be mentioned as the units for communication and the like. Furthermore, ultra wide band (UWB) (registered trademark), ZigBee (registered trademark), and the like can also be mentioned as the units for communication and the like.

Examples of the external device connected to the smartphone 1 include a wired/wireless headset, a wired/wireless external charger, and a wired/wireless data port. Further, a memory card or a subscriber identity module (SIM) card/user identity module (UIM) card connected via a card socket can also be mentioned as an external device. Further, the external device connected thereto includes external audio and video devices connected via audio and video input/output (I/O) terminals, external audio and video devices wirelessly connected, smartphones wired/wirelessly connected, PDAs wired/wirelessly connected, personal computers wired/wirelessly connected, and earphones. The external input and output unit 60 can transmit the data transmitted from such an external device to each component inside the smartphone 1 or can transmit the data inside the smartphone 1 to the external device.

The motion sensor unit 80 comprises, for example, a triaxial acceleration sensor or an inclination sensor and detects a physical movement of the smartphone 1 in response to the instruction from the main control unit 101. With the detection of the physical movement of the smartphone 1, a moving direction, acceleration, or posture of the smartphone 1 is detected. Such a detection result is output to the main control unit 101. The power supply unit 90 supplies electric power accumulated in a battery (not shown) to each unit of the smartphone 1 in response to the instruction from the main control unit 101.

The main control unit 101 comprises a microprocessor and a memory such as RAM or flash memory, and operates according to the control program or the control data stored in the storage unit 50 to integrally control each unit of the smartphone 1 including the camera unit 41. The information such as a repetition pattern of the I frame and the P frame may be stored in the memory of the main control unit 101. The main control unit 101 has a mobile communication control function for controlling each unit of a communication system and an application processing function for performing voice communication or data communication through the wireless communication unit 11.

The main control unit 101 also has an image processing function such as displaying a moving image on the display input unit 20 based on the image data (data of still image or moving image) such as received data or downloaded streaming data. The image processing function means a function of the main control unit 101 decoding the image data, performing the image processing on such a decoding result, and displaying an image on the display input unit 20.

The camera units 41 and 42 are digital cameras (imaging devices) that perform electronic imaging using the imaging element such as CMOS or CCD. Further, the camera units 41 and 42 can convert the image data (moving image, still image) obtained by imaging into compressed image data such as MPEG or JPEG, under the control of the main control unit 101, and record the converted image data in the storage unit 50 or output the converted image data through the external input and output unit 60 or the wireless communication unit 11 (in a case of such compression or recording, the setting of the first/second imaging parameters, the capturing of the first/second moving images, the determination of scene switching, and the compression, recording, and display of the image data, and the like can be performed by the imaging instruction method of the present embodiment, as in the first embodiment). In the smartphone 1 shown in FIGS. 18 and 19, one of the camera units 41 and 42 can be used for imaging, or the camera units 41 and 42 can be used at the same time for imaging. In a case where the camera unit 42 is used, the strobe 43 can be used.

The camera units 41 and 42 can be used for various functions of the smartphone 1. For example, the smartphone 1 can display images acquired by the camera units 41 and 42 on the display panel 21. Further, the smartphone 1 can use the images of the camera units 41 and 42 as one of the operation inputs of the operation panel 22. Further, in a case where the GPS receiving unit 70 detects a position based on positioning information from GPS satellites ST1, ST2, . . . , and STn, the smartphone 1 detects the position by referring to the images from the camera units 41 and 42. Furthermore, the smartphone 1 can determine an optical axis direction of the camera unit 41 of the smartphone 1 or a current use environment without using the triaxial acceleration sensor or in combination with the triaxial acceleration sensor with reference to the images from the camera units 41 and 42. Of course, the smartphone 1 can use the images from the camera units 41 and 42 in the application software. Further, the smartphone 1 can add the position information acquired by the GPS receiving unit 70, voice information acquired by the microphone 32 (may be text information subjected to voice-text conversion by the main control unit or the like), posture information acquired by the motion sensor unit 80, and the like to the image data of the still image or the moving image and record the image data thereof with the added information in the storage unit 50. Further, the smartphone 1 can also output the image data of the still image or the moving image through the external input and output unit 60 and the wireless communication unit 11.

In the smartphone 1 having the above configuration, it is also possible to execute the processing (the setting of the first/second imaging parameters, the capturing of the first/second moving images, the determination of scene switching, and the compression, recording, and display of the image data, and the like) of the imaging instruction method according to the present embodiment, as in the imaging device 100 according to the first embodiment. Specifically, the processing (including the processing of the flowcharts described above) executed by the processor 330 (each unit shown in FIG. 5) in the first embodiment can be executed mainly by the camera units 41 and 42 and the main control unit 101 in the smartphone 1. In addition, the functions of the operation unit 350, the recording device 360, the monitor 370, and the speaker 380 in the first embodiment can be respectively realized by the operation unit 40, the storage unit 50 and the operation panel 22, the display panel 21 and the operation panel 22, and the speaker 31 in the smartphone 1.

Accordingly, it is also possible to obtain the same effect (easy changing of the imaging condition of the moving image) as in the imaging device 100 according to the first embodiment in the smartphone 1 according to the second embodiment.

Although the embodiments of the present invention have been described above, the present invention is not limited to the above aspects, and various modifications can be made without departing from the spirit of the present invention.

EXPLANATION OF REFERENCES

1: smartphone
2: housing
11: wireless communication unit
20: display input unit
21: display panel
22: operation panel
30: call unit
31: speaker
32: microphone
40: operation unit
41: camera unit
42: camera unit
43: strobe 50: storage unit
51: internal storage unit
52: external storage unit
60: external input and output unit
70: GPS receiving unit
80: motion sensor unit
90: power supply unit
100: imaging device
101: main control unit
116A: step
200: interchangeable lens
210: zoom lens
220: stop
230: focus lens
232: reception unit
240: lens drive unit
300: imaging device body
301: mount
302: terminal
303: finder window
304: finder eyepiece portion
310: imaging element
312: light receiving unit
314: analog amplification unit
316: A/D converter
318: imaging element drive unit
320: digital signal processing unit
330: processor
332: reception unit
334: imaging parameter setting unit
336: imaging control unit
338: image processing unit
340: compression processing unit
342: recording control unit
344: display control unit
345: communication control unit
346: lens drive control unit
348: flash memory
349: RAM
350: operation unit
351: release button
352: dial
353: function button
354: exposure correction dial
355: BACK key
356: MENU/OK key
357: cross key
358: Q button
360: recording device
362: memory card
364: first recording folder
366: second recording folder
370: monitor
380: speaker
390: antenna
700: remote controller
710: processor
712: reception unit
714: communication control unit
720: flash memory
722: RAM
730: operation unit
740: antenna
L: optical axis
S100 to S124: each step of imaging instruction method
ST1: GPS satellites
ST2: GPS satellites
ΔT1: blank period
ΔT2: blank period

What is claimed is:

1. An imaging device comprising:
an imaging unit; and
a processor configured to:
receive a first instruction to issue an instruction to set a second imaging parameter different from a first imaging parameter during capturing of a first moving image based on the first imaging parameter by the imaging unit;
receive a second instruction to start capturing of a second moving image based on the second imaging parameter after the reception of the first instruction to cause the imaging unit to start the capturing of the second moving image;
cause, in a case where the second instruction is received, the imaging unit to capture the first moving image until a third instruction to end the capturing of the first moving image is received;
receive an instruction by a user and situation data, which is regarded as the third instruction in a case where a predetermined condition is satisfied, as the third instruction;
cause, in a case where the third instruction is received, the imaging unit to end the capturing of the first moving image; and
determine that the predetermined condition is satisfied and generate the situation data, in a case where scene detection for a moving image captured by the imaging unit is performed and a first time elapses after a scene is switched and/or in a case where a scene after the switching continues for a second time.

2. The imaging device according to claim 1, wherein in a case where a predetermined parameter exceeds a threshold value, the processor determines that the scene is switched.

3. The imaging device according to claim 1, wherein in a case where a remaining capacity of a recording medium for recording the first moving image is smaller than a data size in a case where the first moving image is recorded for a remaining scheduled imaging time, the processor generates the situation data.

4. The imaging device according to claim 1, wherein the processor causes the imaging unit to end the capturing of the first moving image and records the second moving image as the first moving image after the third instruction is received.

5. The imaging device according to claim 1, wherein the processor causes the imaging unit to end the capturing of the second moving image.

6. The imaging device according to claim 1, wherein the processor causes the imaging unit to end the capturing of the second moving image and records the second moving image in association with the first moving image recorded from the reception of the second instruction to the reception of the third instruction.

7. The imaging device according to claim 1, wherein the processor performs image processing and compression processing based on the first imaging parameter on single moving image data output from the imaging unit to generate first moving image data for the first moving image, and performs image processing and compression processing based on the second imaging parameter on the single moving image data to generate second moving image data for the second moving image.

8. The imaging device according to claim 7, wherein the processor generates and records I frames as the first moving image data and the second moving image data in a period in which the first moving image and the second moving image are recorded in parallel.

9. The imaging device according to claim 1, wherein the processor records the first moving image and the second moving image on a single recording medium.

10. The imaging device according to claim 1, wherein the processor causes a display device to display a remaining recording time in a case where only one of the first moving image and the second moving image is recorded and a remaining recording time in a case where both the first moving image and the second moving image are recorded.

11. The imaging device according to claim 1, wherein the processor causes a display device to display the first moving image and the second moving image.

12. The imaging device according to claim 1, wherein the processor performs image processing based on the first imaging parameter and image processing based on the second imaging parameter at different timings.

13. The imaging device according to claim 1, wherein image processing based on the first imaging parameter and image processing based on the second imaging parameter are performed by a same processor.

14. An imaging instruction method using an imaging instruction device including a processor that issues an imaging instruction to an imaging unit of an imaging device, the imaging instruction method comprising:
by the processor,
receiving a first instruction to issue an instruction to set a second imaging parameter different from a first imaging parameter during capturing of a first moving image based on the first imaging parameter by the imaging unit to instruct the imaging unit with the received first instruction;
receiving a second instruction to start capturing of a second moving image based on the second imaging parameter after the reception of the first instruction to cause the imaging unit to start the capturing of the second moving image;
causing, in a case where the second instruction is received, the imaging unit to capture the first moving image until a third instruction to end the capturing of the first moving image is received;
receiving an instruction by a user and situation data, which is regarded as the third instruction in a case where a predetermined condition is satisfied, as the third instruction;
causing, in a case where the third instruction is received, the imaging unit to end the capturing of the first moving image; and
determining that the predetermined condition is satisfied and generating the situation data, in a case where scene detection for a moving image captured by the imaging unit is performed and a first time elapses after a scene is switched and/or in a case where a scene after the switching continues for a second time.

15. The imaging instruction method according to claim 14, wherein in a case where a predetermined parameter exceeds a threshold value, the processor determines that the scene is switched.

16. The imaging instruction method according to claim 14, wherein the processor causes the imaging unit to end the capturing of the first moving image and records the second moving image as the first moving image after the third instruction is received.

17. The imaging instruction method according to claim 14, wherein the processor performs image processing based on the first imaging parameter and image processing based on the second imaging parameter at different timings.

18. The imaging instruction method according to claim 14, wherein image processing based on the first imaging parameter and image processing based on the second imaging parameter are performed by a same processor.

19. A non-transitory, computer-readable tangible recording medium which records thereon a program that causes a computer of an imaging instruction device to execute an imaging instruction to an imaging unit of an imaging device, the program causing the computer to execute:
a function of receiving a first instruction to issue an instruction to set a second imaging parameter different from a first imaging parameter during capturing of a first moving image based on the first imaging parameter by the imaging unit to instruct the imaging unit with the received first instruction;
a function of receiving a second instruction to start capturing of a second moving image based on the second imaging parameter after the reception of the first instruction to cause the imaging unit to start the capturing of the second moving image;
a function of causing, in a case where the second instruction is received, the imaging unit to capture the first moving image until a third instruction to end the capturing of the first moving image is received;
a function of receiving an instruction by a user and situation data, which is regarded as the third instruction in a case where a predetermined condition is satisfied, as the third instruction;
a function of causing, in a case where the third instruction is received, the imaging unit to end the capturing of the first moving image; and
a function of determining that the predetermined condition is satisfied and generating the situation data, in a case where scene detection for a moving image captured by the imaging unit is performed and a first time elapses after a scene is switched and/or in a case where a scene after the switching continues for a second time.

20. The non-transitory, computer-readable tangible recording medium according to claim 19, wherein the program further causes the computer to execute a function of determining that the scene is switched in a case where a predetermined parameter exceeds a threshold value.

* * * * *